(12) United States Patent
Saito

(10) Patent No.: US 9,528,681 B2
(45) Date of Patent: Dec. 27, 2016

(54) LIGHT FLUX CONTROLLING MEMBER, LIGHT EMITTING DEVICE AND ILLUMINATION APPARATUS

(71) Applicant: Enplas Corporation, Saitama (JP)

(72) Inventor: Tomohiro Saito, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 62 days.

(21) Appl. No.: 14/698,195

(22) Filed: Apr. 28, 2015

(65) Prior Publication Data

US 2015/0316228 A1 Nov. 5, 2015

(30) Foreign Application Priority Data

May 2, 2014 (JP) ................. 2014-095281

(51) Int. Cl.
| | | |
|---|---|---|
| *F21V 3/00* | (2015.01) | |
| *F21V 5/04* | (2006.01) | |
| *F21V 5/00* | (2015.01) | |
| *F21V 19/00* | (2006.01) | |
| *F21V 17/08* | (2006.01) | |
| *G02B 3/08* | (2006.01) | |
| *F21V 17/10* | (2006.01) | |
| *F21Y 101/00* | (2016.01) | |

(52) U.S. Cl.
CPC ............. *F21V 5/045* (2013.01); *F21V 5/008* (2013.01); *F21V 17/08* (2013.01); *F21V 17/101* (2013.01); *F21V 19/0035* (2013.01); *G02B 3/08* (2013.01); *F21Y 2101/00* (2013.01)

(58) Field of Classification Search
CPC ........... F21V 5/045; F21V 17/101; G02B 3/08

USPC ................ 362/311.02, 311.06; 359/742
See application file for complete search history.

(56) References Cited

U.S. PATENT DOCUMENTS

| | | | | |
|---|---|---|---|---|
| 5,122,903 A | * | 6/1992 | Aoyama | G02B 5/1876 359/565 |
| 8,007,138 B2 | * | 8/2011 | Bamba | F21V 5/045 362/309 |
| 2012/0075870 A1 | * | 3/2012 | Kayanuma | F21V 5/04 362/311.06 |

FOREIGN PATENT DOCUMENTS

JP 03-289602 A 12/1991

* cited by examiner

*Primary Examiner* — Sean Gramling
(74) *Attorney, Agent, or Firm* — Brundidge & Stanger, P.C.

(57) ABSTRACT

A light flux controlling member of the present invention includes an incidence area and an emission area. The incidence area includes a plurality of protrusions each having an incidence surface, a reflection surface, and a ridge line. The reflection surface disposed outermost includes a plurality of split reflection surfaces that reflects light having entered the light flux controlling member toward the emission area, and one or two or more stepped surfaces disposed between the two adjacent split reflection surfaces and at a dead angle position relative to a traveling direction of the light having entered the light flux controlling member. The protrusion disposed outermost has a projection part projecting in a direction along a central axis, with a tip portion thereof being closer to the emission area than an end portion of the light flux controlling member on a light emitting element side is in the direction along the central axis.

15 Claims, 16 Drawing Sheets

LIGHT FLUX CONTROLLING MEMBER, LIGHT EMITTING DEVICE AND ILLUMINATION APPARATUS

CROSS REFERENCE TO RELATED APPLICATIONS

This application is entitled to and claims the benefit of Japanese Patent Application No. 2014-095281, filed on May 2, 2014, the disclosure of which including the specification, drawings and abstract is incorporated herein by reference in its entirety.

TECHNICAL FIELD

The present invention relates to a light flux controlling member that controls the distribution of light emitted from a light emitting element, and a light emitting device and an illumination apparatus that have the light flux controlling member.

BACKGROUND ART

In recent years, from the viewpoint of energy conservation and miniaturization, illumination apparatuses using light emitting diodes (hereinafter also referred to as "LED") as light sources, (LED flashes), have been used as light emitting devices for imaging cameras. As the light emitting devices described above, light emitting devices in which an LED and a Fresnel lens are combined are well known.

Generally, as a means for combining an LED and a Fresnel lens, a method has been employed in which using an adhesive a Fresnel lens is fixed to a substrate on which an LED is mounted. At that time, the Fresnel lens is fixed to the substrate via supporting parts joined to the substrate. When the Fresnel lens is thus fixed using an adhesive, there is a risk that the adhesive undesirably sticks to an optical surface of the Fresnel lens and reduces the optical performance of the light emitting device. As a means for solving such a drawback, a Fresnel lens has been proposed that is provided with an adhesion target part at the outside of the optical surface (see, e.g., PTL 1).

FIGS. 1A, 1B and 1C are schematic diagrams illustrating a configuration of Fresnel lens 10 disclosed in PTL 1. FIG. 1A is a side view of Fresnel lens 10, FIGS. 1B and 1C are side views illustrating a mode in which Fresnel lens 10 is adhered to supports 20. As illustrated in FIG. 1A, Fresnel lens 10 has substrate 12 for supporting Fresnel lens 10, lens part 14 disposed on substrate 12, and protrusion parts 16 disposed outside lens part 14 on substrate 12. As illustrated in FIG. 1B, when Fresnel lens 10 is adhered to supports 20, adhesive 30 is first applied to support attaching surfaces 18 positioned outside protrusion parts 16 on substrate 12. Next, as illustrated in FIG. 1C, adhesive 30 is cured while the end surfaces of supports 20 are pressed against support attaching surfaces 18, thereby enabling Fresnel lens 10 to be adhered to supports 20. At that time, protrusion parts 16 prevent adhesive 30 from being pressed and spread to reach lens part 14. Thus, it is possible to prevent a decrease in the optical performance due to sticking of adhesive 30.

CITATION LIST

Patent Literature

PTL 1
Japanese Patent Application Laid-Open No. 03-289602

SUMMARY OF INVENTION

Technical Problem

However, Fresnel lens 10 (light flux controlling member) disclosed in PTL 1 has a problem of support attaching surfaces 18 (parts to be adhered) being disposed outside lens part 14 (optical surface), causing Fresnel lens 10 to be undesirably larger in size.

An object of the present invention is to provide a light flux controlling member capable of preventing a decrease in the optical performance due to sticking of an adhesive without becoming larger in size. Another object of the present invention is to provide a light emitting device and an illumination apparatus that have the light flux controlling member.

Solution to Problem

In order to achieve the above-mentioned objects, a light flux controlling member of the present invention is a light flux controlling member that controls a distribution of light emitted from a light emitting element, including: an incidence area that allows light emitted from the light emitting element to enter the light flux controlling member; and an emission area that is formed facing away from the incidence area and configured to emit light having entered the light flux controlling member, wherein the incidence area includes a plurality of protrusions disposed to surround a central axis of the light flux controlling member and each having an incidence surface that is disposed on an inner side of the protrusion and allows a part of the light emitted from the light emitting element to enter the light flux controlling member, a reflection surface that is disposed on an outer side of the protrusion and reflects the incident light toward the emission area, and a ridge line disposed between the incidence surface and the reflection surface, the reflection surface disposed outermost having a plurality of split reflection surfaces that are spaced apart from each other and reflect the light having entered the light flux controlling member toward the emission area and one or two or more stepped surfaces disposed between the two adjacent split reflection surfaces and at a dead angle position relative to a traveling direction of the light having entered the light flux controlling member, and the protrusion disposed outermost has a projection part projecting in a direction along the central axis from the stepped surface, with a tip portion of the projection part being closer to the emission area than an end portion of the light flux controlling member on the light emitting element side is to the emission area in the direction along the central axis.

A light emitting device of the present invention includes a substrate, a supporting part disposed on the substrate, a light emitting element disposed on the substrate, and a light flux controlling member of the present invention disposed on the substrate such that an optical axis of the light emitting element coincides with the central axis of the light flux controlling member and fixed to the supporting part, and the supporting part and the projection part are adhered together.

An illumination apparatus of the present invention includes the light emitting device of the present invention, and a cover that transmits the light emitted from the light emitting device, while diffusing the emitted light.

Advantageous Effects of Invention

According to the present invention, it is possible to provide a light flux controlling member capable of preventing a decrease in the optical performance due to sticking of an adhesive when fixing the light flux controlling member to a substrate. Accordingly, according to the present invention, it is possible to provide a light emitting device and an illumination apparatus that can be manufactured at high yield without causing size increase.

DESCRIPTION OF EMBODIMENTS

Hereinafter, embodiments of the present invention will be described in detail with reference to the accompanying drawings.

Embodiment 1

(Configurations of Light Flux Controlling Member and Light Emitting Device)

Figure 1A:
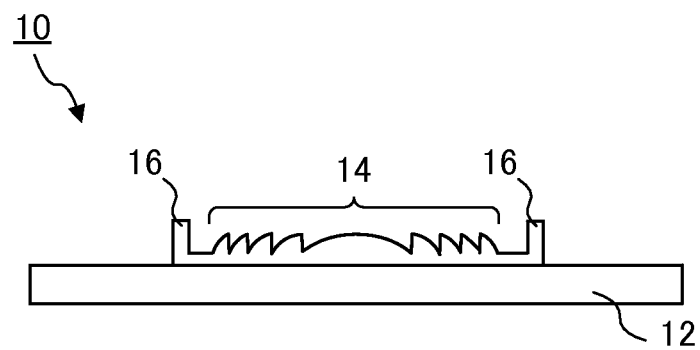
FIG. 1A is a side view of a Fresnel lens disclosed in PTL 1.
Figure 1B:
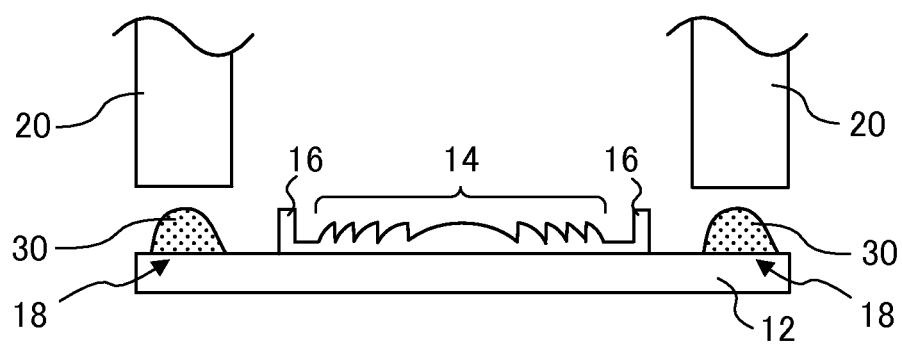
FIGS. 1B and 1C are side views illustrating a mode in which the Fresnel lens disclosed in PTL 1 is adhered to supports.
Figure 1C:
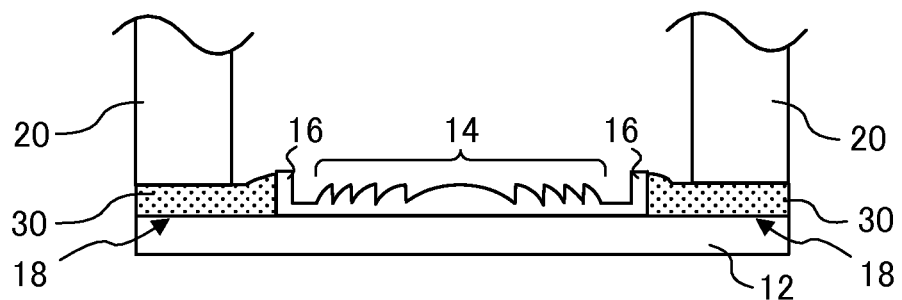
Figure 2A:
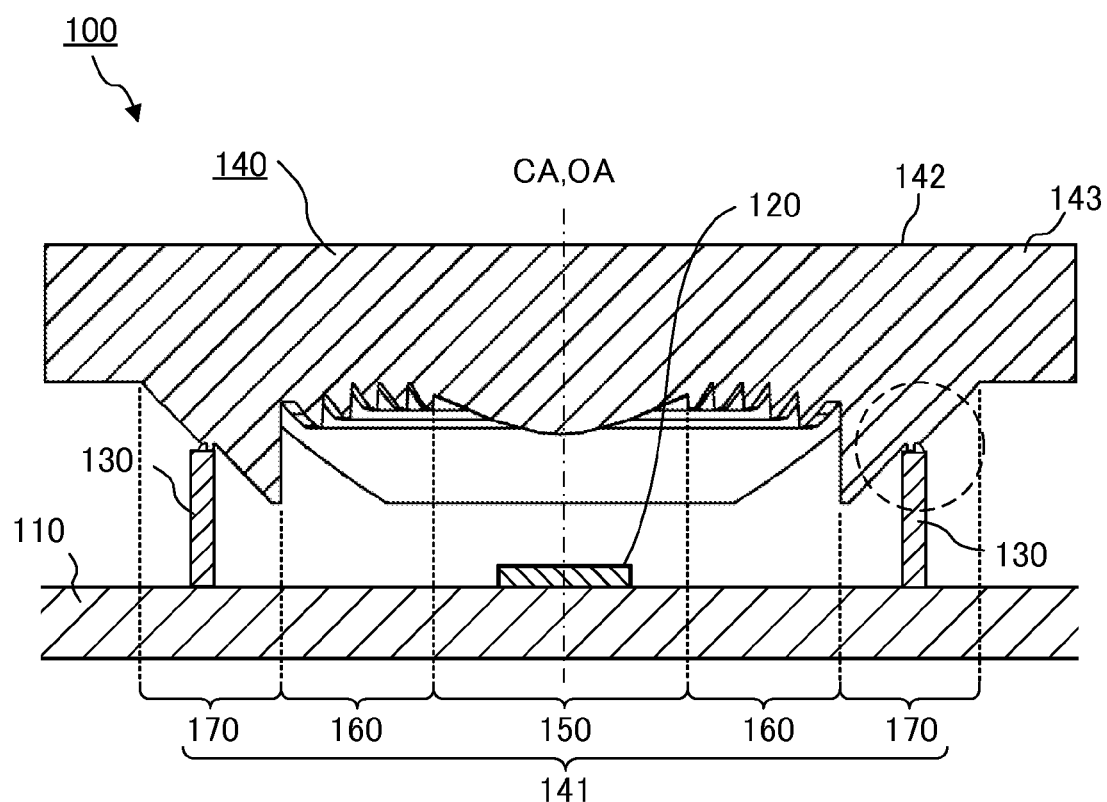
FIGS. 2A and 2B are sectional views of a light emitting device according to Embodiment 1.
Figure 2B:
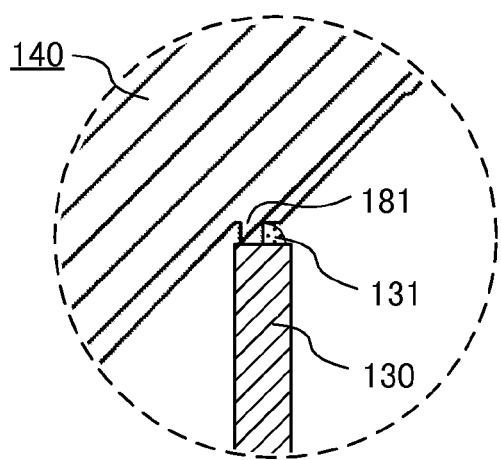

FIG. 2A is a sectional view of light emitting device 100 according to Embodiment 1 of the present invention. FIG. 2B is a partially enlarged sectional view of an area illustrated by a broken line in FIG. 2A. As illustrated in FIG. 2A, light emitting device 100 includes substrate 110, light emitting element 120, supporting part 130 and light flux controlling member 140.

Substrate 110 supports light emitting element 120 and light flux controlling member 140. The type of substrate 110 is not particularly limited. Substrate 110 is, for example, a glass composite substrate or a glass epoxy substrate.

Light emitting element 120 is a light source of light emitting device 100, and is fixed onto substrate 110. Light emitting element 120 is, for example, a light emitting diode (LED) such as a white light emitting diode.

Supporting part 130 is fixed onto substrate 110, and positions (supports) light flux controlling member 140 at a predetermined position. Light flux controlling member 140 is adhered to the tip portion of supporting part 130. The height of supporting part 130 may be set appropriately depending on the characteristics of light emitting device 100 and of light flux controlling member 140. In addition, supporting part 130 either may be formed to surround central axis CA around the entire circumference, or may be formed at a part of the entire circumference. The shape of supporting part 130 is not particularly limited insofar as supporting part 130 can support light flux controlling member 140 while supporting part 130 contacts only projection part 181 (described later) of light flux controlling member 140. The shape of supporting part 130 is, for example, a prism, circular column, square tube, cylinder, or the like. In the present embodiment, the shape of supporting part 130 is a quadrangular prism. Supporting part 130 either may be formed as a single piece with substrate 110 or may be a separate member from substrate 110. The number of supporting part 130 is not particularly limited, either, insofar as supporting part 130 can support light flux controlling member 140. In the present embodiment, the number of supporting part 130 is four.

Light flux controlling member 140 controls the distribution of light emitted from light emitting element 120. Light flux controlling member 140 is fixed onto supporting part 130 using adhesive 131 such that its central axis CA coincides with optical axis OA of light emitting element 120. The material for light flux controlling member 140 is not particularly limited insofar as the material can transmit light of a desired wavelength. Examples of the material for light flux controlling member 140 include optically transparent resins such as polymethylmethacrylate (PMMA), polycarbonate (PC) and epoxy resin (EP), silicone resins, and glass. Light flux controlling member 140 can be manufactured, for example, by injection molding.

Figure 3:
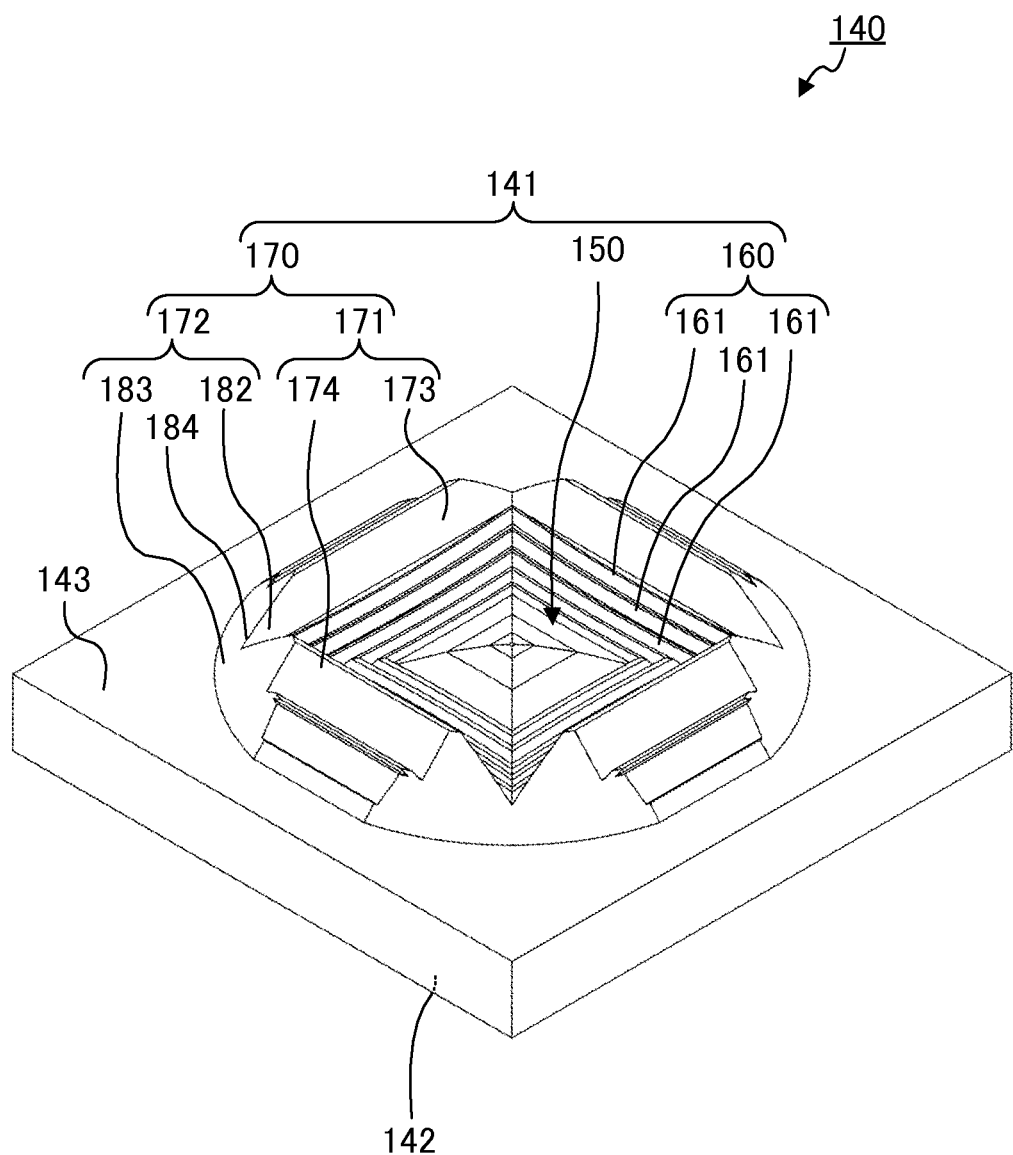
FIG. 3 is a perspective view of the light flux controlling member according to Embodiment 1.
Figure 5A:
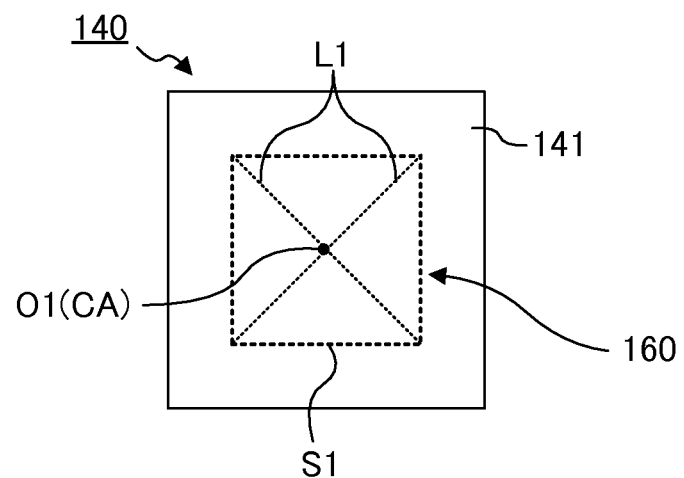
FIGS. 5A and 5B are bottom views of the light flux controlling member according to Embodiment 1, with a refraction part, a Fresnel lens part and an outermost lens part being omitted.
Figure 5B:
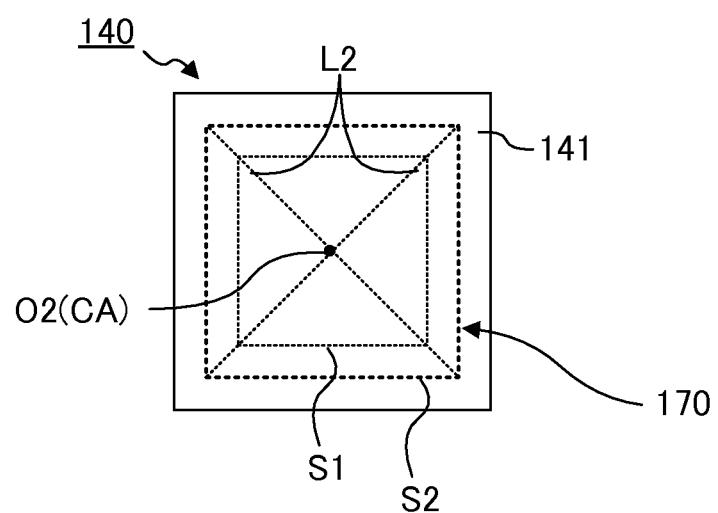
Figure 6A:
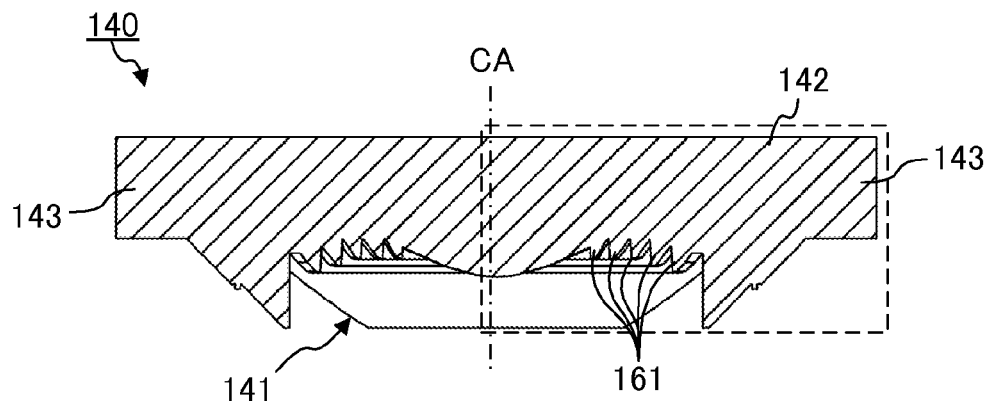
FIGS. 6A to 6C are sectional views of the light flux controlling member according to Embodiment 1.
Figure 6B:
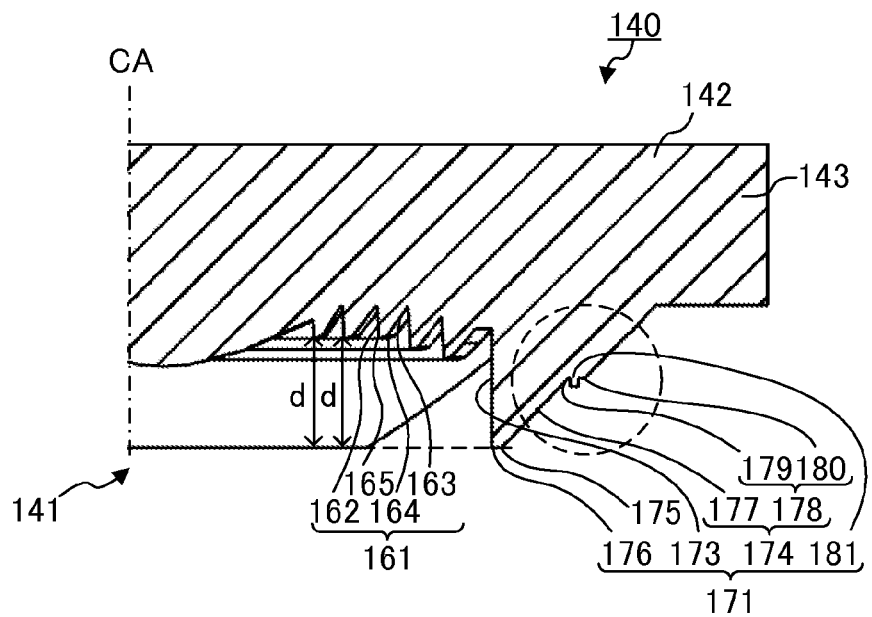
Figure 6C:
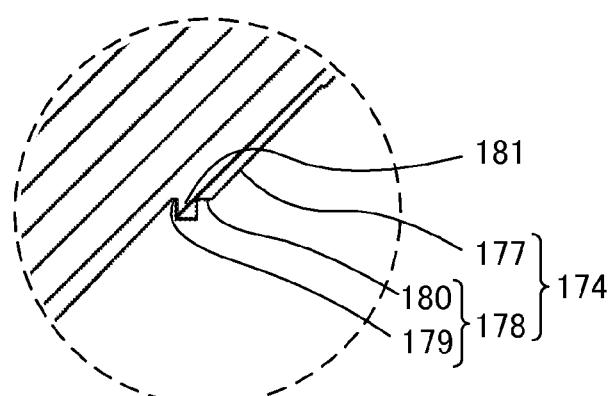
Figure 7:
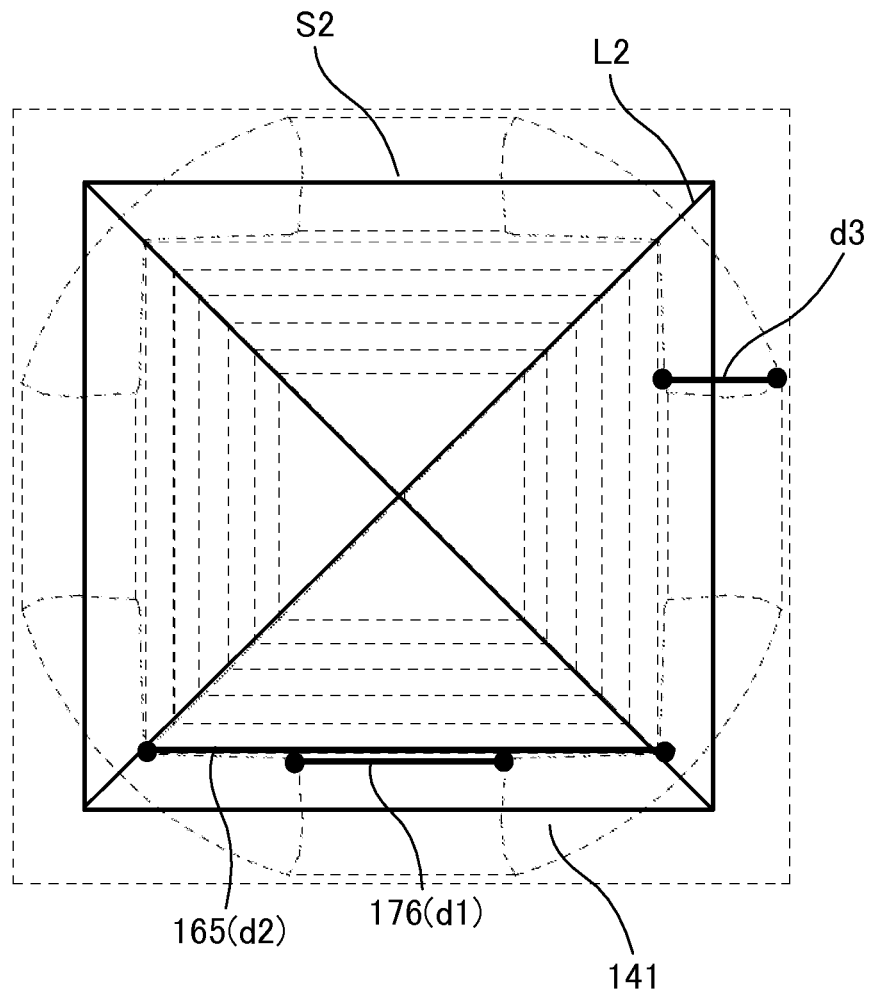
FIG. 7 is an explanatory drawing of an arrangement of a second protrusion and a corner.

FIGS. 3 to 7 are drawings illustrating the configuration of light flux controlling member 140 according to Embodiment 1. FIG. 3 is a perspective view of light flux controlling member 140 according to Embodiment 1. FIG. 4A is a plan view of light flux controlling member 140, FIG. 4B is a bottom view of light flux controlling member 140, and FIG. 4C is a side view of light flux controlling member 140. FIG. 5A is a bottom view of light flux controlling member 140, with only first virtual quadrangle S1 being illustrated, and FIG. 5B is a bottom view of light flux controlling member 140, with only first virtual quadrangle S1 and second virtual quadrangle S2 being illustrated. FIG. 6A is a sectional view taken along line A-A illustrated in FIG. 4B, FIG. 6B is a partially enlarged sectional view of an area indicated by a broken line in FIG. 6A, and FIG. 6C is a partially enlarged sectional view of an area indicated by a broken line in FIG. 6B. FIG. 7 is an explanatory drawing of the arrangement of second protrusion 171 and corner 172.

As illustrated in FIGS. 3 to 7, light flux controlling member 140 includes incidence area 141 that allows light emitted from light emitting element 120 to enter light flux controlling member 140, and emission area 142 positioned facing away from incidence area 141 and configured to emit light having entered light controlling member 140. Flange 143 may be provided between incidence area 141 and emission area 142.

Figure 4A:
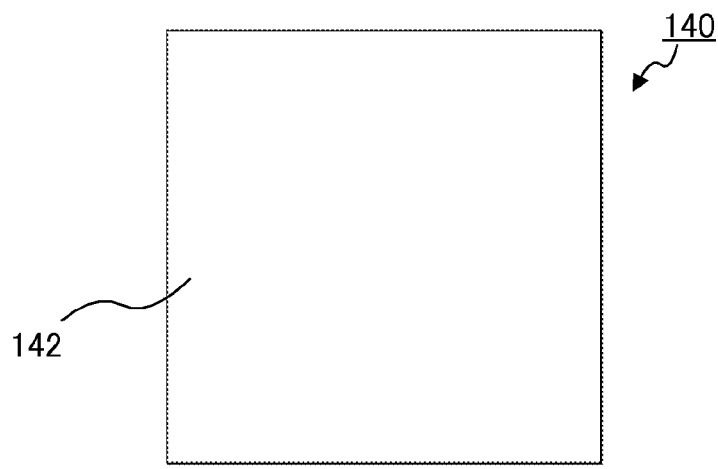
FIGS. 4A to 4C illustrate a configuration of the light flux controlling member according to Embodiment 1.

The shape of light flux controlling member 140 in a plan view is not particularly limited. As illustrated in FIG. 4A, in the present embodiment, the shape of light flux controlling member 140 in a plan view is square. In addition, the length of one side of light flux controlling member 140 in the present embodiment is, for example, about 4.7 mm.

Incidence area 141 allows light emitted from light emitting element 120 to enter light flux controlling member 140. Incidence area 141 includes refraction part 150 positioned at the central portion of incidence area 141, Fresnel lens part 160 positioned outside refraction part 150, and outermost lens part 170 positioned outside Fresnel lens part 160. Incidence area 141 has 2-fold symmetry or 4-fold symmetry. The outer shape of incidence area 141 is, for example, rectangular or square.

Refraction part 150 allows a part of light emitted (light emitted at a smaller angle relative to optical axis OA) from light emitting element 120 to enter light flux controlling member 140, and refracts the incident light toward emission area 142. As illustrated in FIG. 2A, refraction part 150 is disposed at a position facing light emitting element 120 to intersect central axis CA of light flux controlling member 140 (optical axis OA of light emitting element 120). It is noted that the shape of refraction part 150 is not particularly limited insofar as refraction part 150 can exhibit the above-mentioned functions. For example, the shape of refraction part 150 may be a refractive Fresnel lens. In addition, the surface of refraction part 150 may either be a spherical surface or an aspherical surface. As illustrated in FIGS. 2A and 3, in the present embodiment, the surface of refraction part 150 is an aspherical surface, and the shape of refraction part 150 is an approximately quadrangular pyramidal shape.

Fresnel lens part 160 allows a part of light emitted (light emitted at a relatively larger angle relative to optical axis OA) from light emitting element 120 to enter light flux controlling member 140, and reflects the incident light toward emission area 142. Fresnel lens part 160 has a plurality of first protrusions (protrusions) 161 for controlling the traveling direction of the light emitted from light emitting element 120.

As illustrated in FIG. 5A, suppose that first virtual quadrangle (virtual quadrangle) S1 is disposed at Fresnel lens part 160. Center O1 (intersection of first diagonal lines L1) of first virtual quadrangle S1 coincides with central axis CA of light flux controlling member 140. First virtual quadrangle S1 and four first diagonal lines L1 constitute a reference for disposing a plurality of first protrusions 161. A plurality of first protrusions 161 are disposed to surround central axis CA of light flux controlling member 140. In the present embodiment, a plurality of first protrusions 161 are disposed to link two adjacent first diagonal lines L1. A plurality of first protrusions 161 either may have a linear shape or may have a curved shape. In addition, as illustrated in FIG. 6B, a plurality of first protrusions 161 are disposed such that a valley portion is formed between two adjacent first protrusions 161 in an area between two adjacent first diagonal lines L1.

The shape and size of first protrusion 161 are not particularly limited, and either may be the same as one another, or may be different from one another. As illustrated in FIG. 6B, in the present embodiment, the sizes of a plurality of first protrusions 161 are different from one another. In addition, distance d between the end portion of light flux controlling member 140 on light emitting element 120 side and first ridge line 165 of each first protrusion 161 (distance d from the reference plane to first ridge line 165) in the direction of optical axis OA becomes gradually shorter as being outward from the inner side of first protrusion 161. Here, the term "end portion of light flux controlling member 140 on light emitting element 120 side" means the apex of second protrusion 171 (second ridge line 176) to be described later, and the term "reference plane" means a planar surface including the apex of second protrusion 171 (second ridge line 176)

First protrusion 161 has first incidence surface 162, first reflection surface 163, first connection surface 164, and first ridge line 165. As illustrated in FIG. 6B, in first protrusion 161, first incidence surface 162 is disposed inside (central axis CA side), and first reflection surface 163 is disposed outside.

First incidence surface 162 allows a part of light emitted from light emitting element 120 to enter light flux controlling member 140, and refracts the part of the light toward first reflection surface 163. First incidence surface 162 either may be a planar surface, or may be a curved surface. In the present embodiment, first incidence surface 162 is a curved surface. In addition, first incidence surface 162 preferably slightly inclines relative to central axis CA from the viewpoint of forming light flux controlling member 140. First incidence surface 162 inclines to be away from central axis CA as being closer to the end portion (reference plane) of light flux controlling member 140 on light emitting element 120 side. The inclining angle of first incidence surface 162 is preferably within a range of more than 0° and 10° or less relative to central axis CA in an arbitrary cross-section including central axis CA. The inclining angle of first incidence surface 162 is preferably 5° or less, and more preferably 3° or less.

First reflection surface 163 is formed together with first incidence surface 162 in pairs, and reflects light having entered light flux controlling member 140 toward emission area 142. First reflection surface 163 either may be a planar surface, or may be a curved surface. In the present embodiment, first reflection surface 163 is a curved surface. In addition, first reflection surface 163 preferably inclines relative to central axis CA from the viewpoint of totally reflecting the light having reached first reflection surface 163. First reflection surface 163 inclines to be closer to central axis CA as being closer to the end portion (reference plane) of light flux controlling member 140 on light emitting element 120 side.

First connection surface 164 is disposed between first incidence surface 162 and first reflection surface 163. First connection surface 164 links first incidence surface 162 to first reflection surface 163. First connection surface 164 either may be a planar surface, or may be a curved surface. In the present embodiment, first connection surface 164 is a planar surface. In addition, first incidence surface 162 and first reflection surface 163 may be directly linked together without forming first connection surface 164.

First ridge line 165 is a boundary line between first incidence surface 162 and first connection surface 164. First ridge line 165 is disposed to link two adjacent first diagonal lines L1 of first virtual quadrangle S1. It is noted that, when first connection surface 164 is not formed, first ridge line 165 is a boundary line between first incidence surface 162 and first reflection surface 163. When first connection surface 164 is provided between first incidence surface 162 and first reflection surface 163, the manufacturability can be enhanced by removing an acute angle portion. When incidence area 141 is viewed in a plan view, first ridge line 165 either may be a straight line, or may be a curve. In the present embodiment, when incidence area 141 is viewed in a plan view, first ridge line 165 is a curve convex toward central axis CA.

Outermost lens part 170 allows a part of light emitted (light emitted at a larger angle relative to optical axis OA) from light emitting element 120 to enter light flux controlling member 140, and reflects the incident light toward emission area 142. Outermost lens part 170 has four second protrusions 171 and four corners 172.

As illustrated in FIG. 5B, suppose that second virtual quadrangle S2 is disposed at outermost lens part 170. Center O2 (intersection of second diagonal lines L2) of second virtual quadrangle S2 coincides with central axis CA of light flux controlling member 140. Second virtual quadrangle S2 constitutes a reference for disposing four second protrusions 171 and four corners 172. Second virtual quadrangle S2 is disposed outside first virtual quadrangle S1. Second virtual quadrangle S2 and first virtual quadrangle S1 are disposed to be similar to and concentric with each other, and such that the respective sides are parallel to each other. As described above, first ridge line 165 may be disposed to link two adjacent first diagonal lines L1 of first virtual quadrangle S1. Therefore, first ridge line 165 and second ridge line 176 to be described later may not be parallel to each other since the two ridge lines sometimes may be formed of a curve.

Four second protrusions 171 are disposed to surround central axis CA of light flux controlling member 140 together with four corners 172. Four second protrusions 171 are disposed respectively on each side of second virtual quadrangle S2. The sectional area of second protrusion 171 taken along a plane orthogonal to a side on which the second protrusion 171 is disposed is larger than the sectional area of first protrusion 161 taken along a plane orthogonal to the side on which the second protrusion 171 is disposed. Corners 172 are connected to both ends of second protrusions 171. The length of second protrusion 171 in a direction parallel to the side of second virtual quadrangle S2 is shorter than the length of first protrusion 161 disposed outermost. When light flux controlling member 140 is used for the above-mentioned light emitting device 100, the length of second protrusion 171 in the direction parallel to the side of second virtual quadrangle S2 is preferably longer than the width of light emitting element 120 to be used for light emitting device 100.

Second protrusion 171 is formed to have an approximately triangular prism shape. The sectional shape of second protrusion 171 taken along a plane orthogonal to the side on which the second protrusion 171 is disposed is approximately triangular. As illustrated in FIG. 6B, each of four second protrusions 171 has second incidence surface 173, second reflection surface 174, second connection surface 175, second ridge line 176, and projection part 181. In second protrusion 171, second incidence surface 173 is disposed inside (central axis CA side), and second reflection surface 174 is disposed outside.

Second incidence surface 173 allows a part of light emitted from light emitting element 120 to enter light flux controlling member 140, and refracts the part of the light toward second reflection surface 174. Second incidence surface 173 either may be a planar surface, or may be a curved surface. In the present embodiment, second incidence surface 173 is a planar surface. In addition, second incidence surface 173 either may be a vertical surface parallel to central axis CA, or may be an inclining surface inclining relative to central axis CA. In the present embodiment, second incidence surface 173 inclines to be away from central axis CA as being closer to the end portion (reference plane) of light flux controlling member 140 on light emitting element 120 side.

Second reflection surface 174 is formed together with second incidence surface 173 in pairs, and reflects light having entered light flux controlling member 140 toward emission area 142. Second reflection surface 174 has a plurality of split reflection surfaces 177 and stepped surface 178. Split reflection surfaces 177 are spaced apart from each other in the direction orthogonal to central axis CA. Specifically, split reflection surface 177 and stepped surface 178 are disposed alternately to follow the surface of second reflection surface 174 from light emitting element 120 side to emission area 142 side.

Split reflection surface 177 reflects light having entered light flux controlling member 140 toward emission area 142. Split reflection surface 177 is disposed parallel to the extending direction of second protrusion 171. The number of split reflection surface 177 is not particularly limited insofar as a plurality of split reflection surfaces 177 are provided. In the present embodiment, the number of split reflection surface 177 is three. Split reflection surface 177 either may be formed to have the same width, or may be formed to have different widths from one end portion to the other end portion of the extending direction of second protrusion 171. In the present embodiment, split reflection surface 177 is formed to have the same width from one end to the other end. In addition, all of a plurality of split reflection surfaces 177 either may be formed to have the same width, or may be formed to have different widths individually. In the present embodiment, a plurality of split reflection surfaces 177 are formed to have different widths individually. In addition, split reflection surface 177 either may be a planar surface, or may be a curved surface. In the present embodiment, split reflection surface 177 is a planar surface. Specifically, split reflection surface 177 is a straight line in a cross-section orthogonal to central axis CA (horizontal cross-section). Further, split reflection surface 177 is a straight line in a cross-section including central axis CA (vertical cross-section). Split reflection surface 177 inclines to be closer to central axis CA as being closer to the end portion (reference plane) of light flux controlling member 140 on light emitting element 120 side.

Stepped surface 178 is disposed between two adjacent split reflection surfaces 177. In the present embodiment, stepped surface 178 has first stepped surface 179 and second stepped surface 180. First stepped surface 179 is disposed to be inside and adjacent to projection part 181. Second stepped surface 180 is disposed to be outside and adjacent to projection part 181. In addition, in the present embodiment, the clearance between first stepped surface 179 and the tip portion of projection part 181 is the same as the clearance between second stepped surface 180 and the tip portion of projection part 181, in the direction along central axis CA. Stepped surface 178 is disposed at a dead angle position relative to the traveling direction of light having entered light flux controlling member 140. Here, the term "dead angle" means an area where no incident light passes through directly. That is, the light having entered light flux controlling member 140 does not reach stepped surface 178 directly. The number of stepped surface 178 is one or two or more. For example, when the number of split reflection surface 177 is two, the number of stepped surface 178 is one. Further, when the number of split reflection surface 177 is three, the number of stepped surface 178 is two. Stepped surface 178 either may be formed to have the same width, or may be formed to have different widths from one end portion to the other end portion of the extending direction of second protrusion 171. In the present embodiment, stepped surface 178 is formed to correspond to the width of split reflection surface 177. In addition, stepped surfaces 178 either may be a planar surface, or may be a curved surface. In the present embodiment, stepped surface 178 is a planar surface. The inclining angle of stepped surface 178 is not particularly limited insofar as the light having entered light flux controlling member 140 does not reach stepped surface 178 directly. As illustrated in FIG. 8B, the inclining angle of stepped surface 178 is larger than an angle between light traveling toward the upper end portion of split reflection surface 177 (end portion on emission area 142 side), out of light having entered light flux controlling member 140, and a straight line in the direction vertical to second virtual quadrangle S2 (central axis CA), in a cross-section including a straight line in the direction orthogonal to second virtual quadrangle S2. In the present embodiment, the angle of stepped surface 178 relative to the straight line in the direction vertical to second virtual quadrangle S2 is 90° (parallel to second virtual quadrangle S2).

Second ridge line 176 is a boundary line between second incidence surface 173 and second connection surface 175. It is noted that, when second connection surface 175 is not formed, second ridge line 176 is a boundary line between second incidence surface 173 and second reflection surface 174 (split reflection surface 177). Thus, when second connection surface 175 is provided between second incidence surface 173 and second reflection surface 174, the manufacturability can be enhanced by removing an acute angle portion. In addition, as illustrated in FIG. 7, distance d1 between the end portions of second ridge line 176 is shorter than distance d2 between the end portions of first ridge line 165 of first protrusion 161 disposed outermost. When light flux controlling member 140 is used for the above-mentioned light emitting device 100, distance d1 between the end portions of second ridge line 176 is preferably longer than the width of light emitting element 120 to be used for light emitting device 100.

Projection part 181 is a convex part projecting in the direction along central axis CA from stepped surface 178. As illustrated in FIG. 2B, projection part 181 is an adhesion target part when light flux controlling member 140 is adhered to supporting part 130. Projection part 181 is formed on stepped surface 178 and is positioned at a dead angle relative to light having entered light flux controlling member 140, and thus does not affect the optical performance of light emitting device 100. Projection part 181 is disposed between first stepped surface 179 and second stepped surface 180. In the direction along central axis CA, the tip portion of projection part 181 is positioned closer to emission area 142 than the end portion (reference plane) of light flux controlling member 140 on light emitting element 120 side is to emission area 142. The height of projection part 181 is not particularly limited insofar as projection part 181 satisfies the above-described requirements.

The shape of projection part 181 is not particularly limited insofar as projection part 181 can be adhered to supporting part 130 and insofar as adhesive 131 can be prevented from sticking to the optical surface (split reflection surface 177). The shape of projection part 181 is, for example, a prism, semi-circular column, square tube, cylinder, or the like. In the present embodiment, the shape of projection part 181 is a quadrangular prism having approximately the same length as that of stepped surface 178 in the longitudinal direction of second ridge line 176. In addition, the position and the number of projection part 181 are not particularly limited insofar as light flux controlling member 140 can be properly fixed onto supporting part 130. In the present embodiment, one projection part 181 is disposed for one stepped surface 178.

Four corners 172 are disposed respectively at four corners of second virtual quadrangle S2. Corner 172 is a part of an approximately conic solid having the apex being disposed on center O2 side of second virtual quadrangle S2. Corner 172 has third incidence surface 182, third reflection surface 183, and third ridge line 184. Here, the term "approximately conic solid (conically-shaped solid)" means a stereoscopic shape formed by connecting the apex to the outer rim of the bottom surface with a straight line or a curve. Examples of the approximately conic solid (conically-shaped solid) include a pyramid, an approximate pyramid in which a line connecting the apex to a point on the circumference of the bottom surface is convex outwardly, an approximate pyramid in which a line connecting the apex to a point on the circumference of the bottom surface is convex inwardly, a cone, an approximate cone having a generatrix being convex outwardly, and an approximate cone having a generatrix being convex inwardly. In the present embodiment, the approximately conic solid (conically-shaped solid) is the approximate cone having a generatrix being convex outwardly.

Third incidence surface 182 allows a part of the rest of light emitted from light emitting element 120 to enter light flux controlling member 140, and refracts the part of the rest of the light toward third reflection surface 183. Third incidence surface 182 either may be a planar surface, or may be a curved surface. In the present embodiment, third incidence surface 182 is formed of two planar surfaces. In addition, each of the two planar surfaces preferably inclines relative to central axis CA. Each of the two planar surfaces inclines to be away from central axis CA as being closer to the end portion (reference plane) of light flux controlling member 140 on light emitting element 120 side. Further, the two planar surfaces constituting third incidence surface 182 may be formed on the same planar surface as that of second incidence surface 173 to which each two planar surface is adjacent.

Third reflection surface 183 is formed together with third incidence surface 182 in pairs, and reflects light having entered light flux controlling member 140 toward emission area 142. In the present embodiment, third reflection surface 183 is a curved surface. The outer edge portion in the cross-section orthogonal to central axis CA (horizontal cross-section) of third reflection surface 183 is a curve being convex outwardly. In addition, the outer edge portion in the cross-section including central axis CA (vertical cross-section) of third reflection surface 183 is also a curve being convex outwardly. Third reflection surface 183 corresponds to a part of the side surface of the approximate cone, and connects to two adjacent second reflection surfaces 174 to link these two second reflection surfaces 174.

Third ridge line 184 is a boundary line between third incidence surface 182 and third reflection surface 183. As described later, third ridge line 184 is a curve formed such that the distance from emission area 142 is gradually decreased as being closer to second diagonal line L2 of second virtual quadrangle S2 from second protrusion 171 side. In addition, as illustrated in FIG. 7, when incidence area 141 is viewed in a plan view, distance d3 between the outermost edge of third reflection surface 183 and third ridge line 184 is gradually decreased as being closer to second diagonal line L2 of second virtual quadrangle S2. Thus, a recessed portion is formed at a position where corner 172 and second diagonal line L2 of second virtual quadrangle S2 intersect each other. It is noted that a connection surface (third connection surface) may be formed by chamfering the boundary between third incidence surface 182 and the third reflection surface 183. In this case, third ridge line 184 composes a boundary line between third incidence surface 182 and the third connection surface.

As illustrated in FIG. 2A, emission area 142 is a planar surface formed on an area to be irradiated side, opposite to light emitting element 120. Emission area 142 is formed to intersect central axis CA of light flux controlling member 140. Emission area 142 emits light having entered light flux controlling member 140, light having entered light flux controlling member 140 and being reflected at first reflection surface 163, light having entered light flux controlling member 140 and being reflected at second reflection surface 174, and light having entered light flux controlling member 140 and being reflected at third reflection surface 183 toward the area to be irradiated.

Figure 4B:
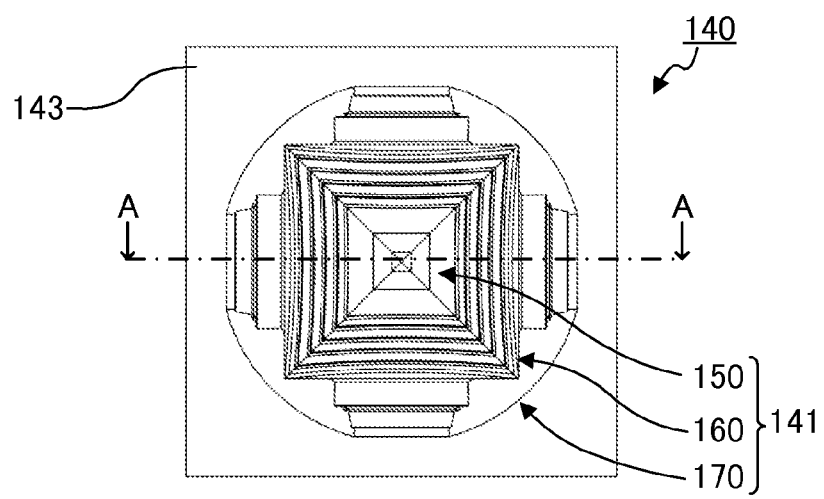
Figure 4C:
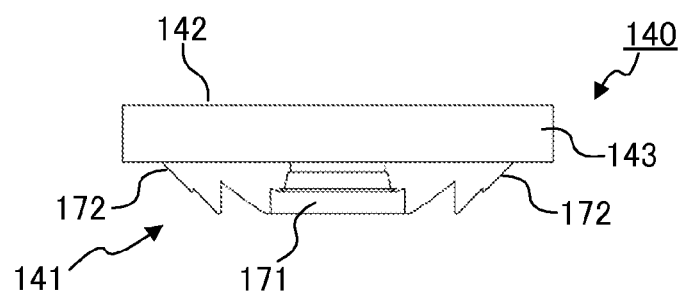
Figure 8A:
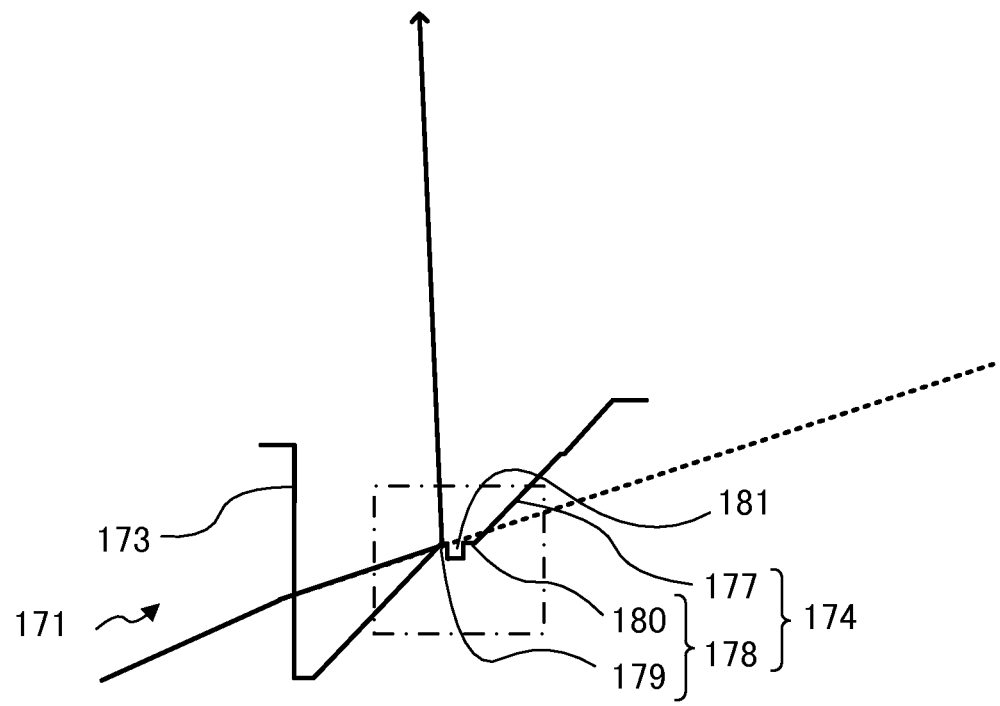
FIGS. 8A and 8B are a part of views of optical path in the light flux controlling member.
Figure 8B:
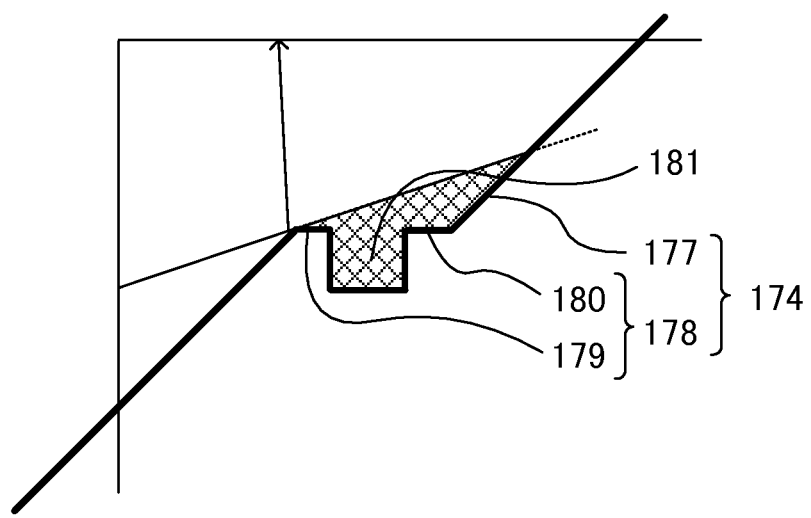

FIGS. 8A and 8B illustrate a part of an optical path inside light flux controlling member 140. FIG. 8A illustrates an optical path of light in a part of sectional views taken along line A-A illustrated in FIG. 4B, and FIG. 8B is a partially enlarged drawing of an area indicated by a dashed line in FIG. 8A. In FIGS. 8A and 8B, a hatching is omitted in order to indicate an optical path.

As illustrated in FIG. 8A, light having entered light flux controlling member 140 is refracted toward second reflection surface 174. Then, light having reached split reflection surface 177 of second reflection surface 174 is reflected toward emission area 142. At that time, as illustrated in FIG. 8B, stepped surface 178 is positioned at a dead angle (see shaded portion in FIG. 8B) relative to the traveling direction of the incident light (stepped surface 178 does not function as a reflection surface or a refraction surface). That is, the light having entered light flux controlling member 140 does not reach stepped surface 178 directly.

As described above, projection part 181 is formed at stepped surface 178, and thus projection part 181 does not affect the control of the light distribution of light flux controlling member 140. In addition, as described above, projection part 181 is adhered to supporting part 130 with adhesive 131. Thus, substrate 110 (supporting part 130) and light flux controlling member 140 are fixed together inside the end portion of second reflection surface 174 on emission area 142 side (inside the optical surface). More specifically, as illustrated in FIG. 2B, the outer peripheral surface of projection part 181 and the end surface of supporting part 130 are adhered together with adhesive 131. Application of adhesive 131 to the outer peripheral surface of projection part 181 preventing adhesive 131 from going around to the inside of protrusion part 181 and sticking to the optical surface (split reflection surface 177). In contrast, in the conventional light flux controlling member (Fresnel lens) 10 disclosed in PTL 1, the part to be adhered is disposed outside the optical surface of light flux controlling member 10 in order to prevent adhesive 30 from sticking to lens part 14. Therefore, light flux controlling member 10 undesirably becomes larger in size. That is, light flux controlling member 140 according to the present invention can prevent a decrease in the optical performance due to sticking of adhesive 131 without becoming larger in size. It is noted that, insofar as adhesive 131 is positioned at a dead angle relative to the light having entered light flux controlling member 140, adhesive 131 may stick to second reflection surface 174.

(Configuration of Illumination Apparatus)

Next, illumination apparatus 500 having light emitting device 100 according to the present embodiment will be described.

Figure 9:
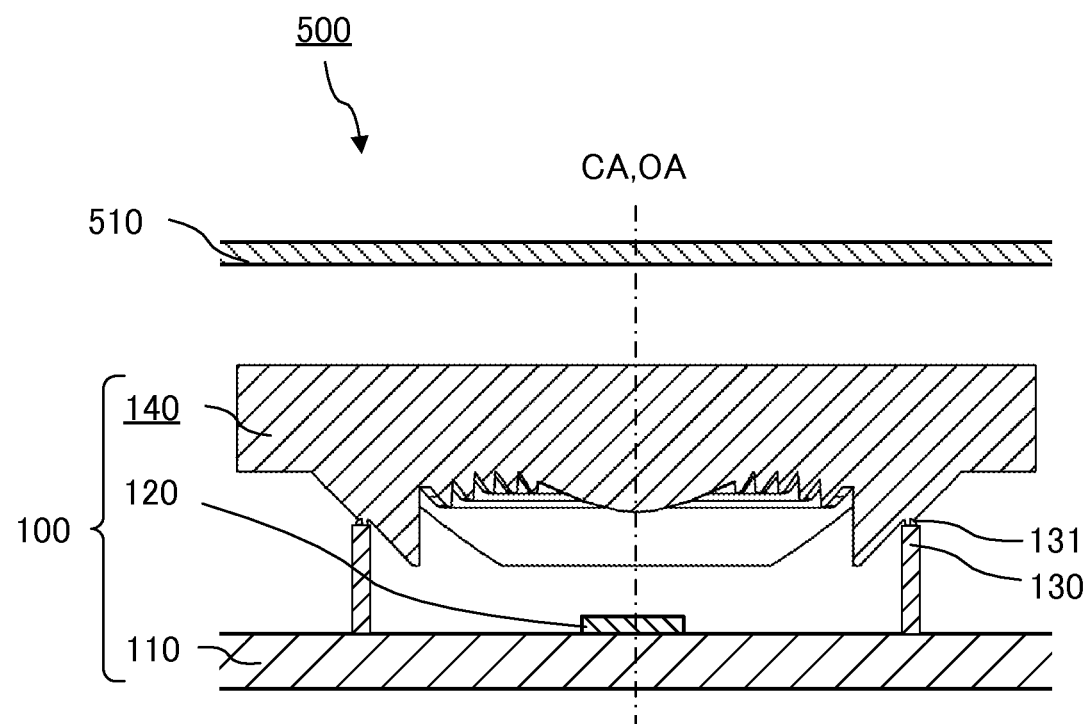
FIG. 9 is a sectional view of an illumination apparatus according to Embodiment 1.

FIG. 9 is a drawing illustrating the configuration of illumination apparatus 500 according to the present embodiment. As illustrated in FIG. 9, illumination apparatus 500 has light emitting device 100 and cover 510. As described above, light emitting device 100 includes substrate 110, light emitting element 120, supporting part 130, and light flux controlling member 140.

Cover 510 transmits light emitted from light emitting device100, while diffusing the emitted light, and protects light emitting device 100. Cover 510 is disposed on an optical path of the light to be emitted from light emitting device 100. The material for cover 510 is not particularly limited insofar as the above-described functions can be exhibited. Examples of the material for cover 510 include optically transparent resins such as polymethylmethacrylate (PMMA), polycarbonate (PC) and epoxy resin (EP), and glass.

(Effect)

As described above, in light flux controlling member 140 according to the present embodiment, projection part 181 (part to be adhered) for fixing light flux controlling member 140 to substrate 100 (supporting part 130) is disposed at a position being inside the optical surface and being at a dead angle relative to light having entered light flux controlling member 140. Accordingly, light flux controlling member 140 according to the present embodiment can prevent the decrease in the optical performance due to the sticking of adhesive 131 when being fixed to substrate 110 without becoming larger in size. Further, light emitting device 100 and illumination apparatus 500 having this light flux controlling member 140 can be manufactured at high yield without becoming larger in size.

It is noted that, in the description of the present embodiment, all of third reflection surfaces 183 of four corners 172 form a part of the side surface of one approximate cone having the apex on central axis CA of light flux controlling member 140 (central axis CA of light flux controlling member 140 coincides with the central axis of the approximate cone). However, each of four third reflection surfaces 183 may form a part of the side surface of each of approximate conic solids having different central axes.

Embodiment 2

The light emitting device and the illumination apparatus according to Embodiment 2 differ, respectively, from light emitting device 100 and illumination apparatus 500 according to Embodiment 1 in the shape of light flux controlling member 240. Light flux controlling member 240 according to Embodiment 2 differs from light flux controlling member 140 according to Embodiment 1 only in the shape of stepped surface 278 in second reflection surface 274 of outermost lens part 270. Thus, the same components as those of light emitting device 100 and illumination apparatus 500 according to Embodiment 1 are indicated by the same reference signs, and the explanations therefor will be omitted. The components that are different from those of light flux controlling member 140 will be mainly described.

(Configurations of Light Flux Controlling Member and Light Emitting Device)

Figure 10:
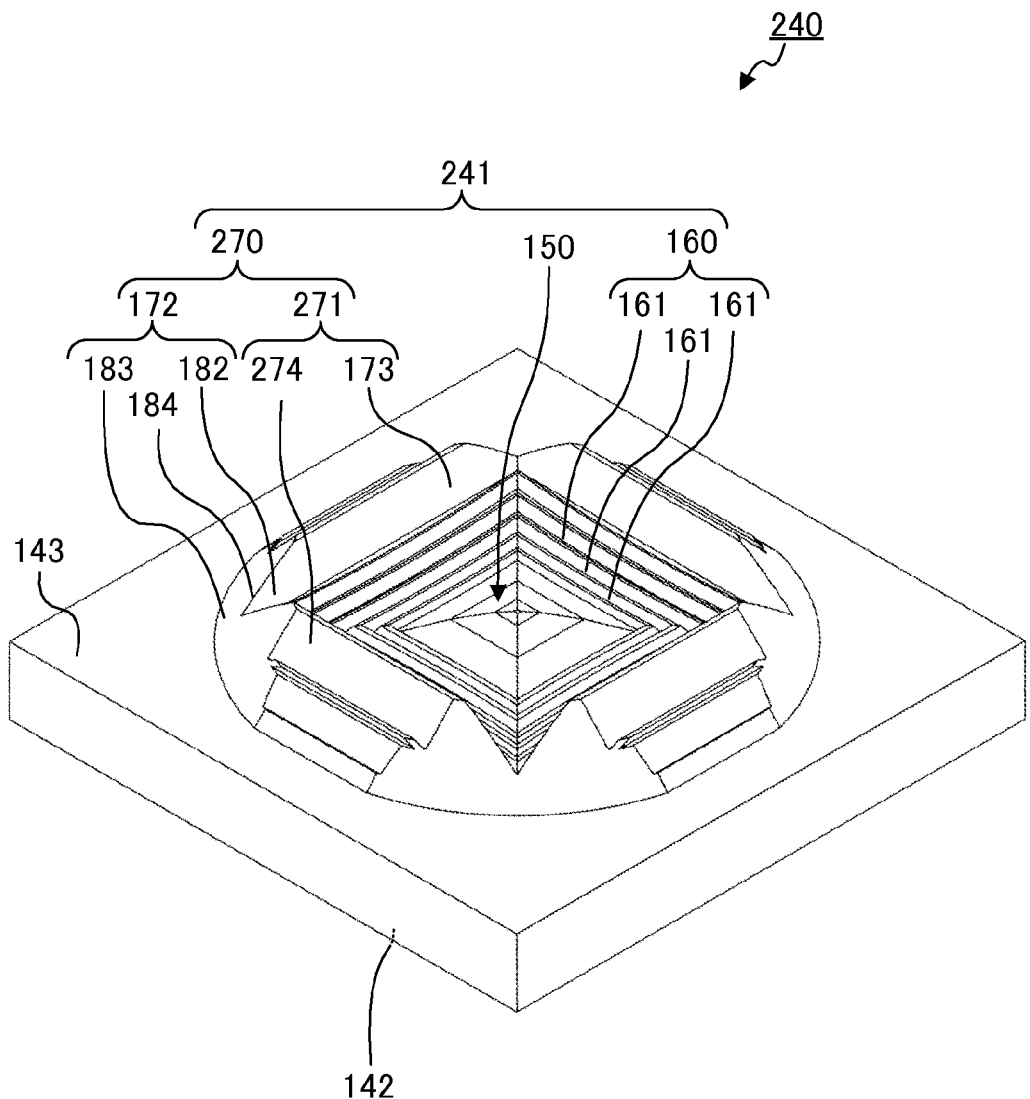
FIG. 10 is a perspective view of a light flux controlling member according to Embodiment 2.
Figure 11A:
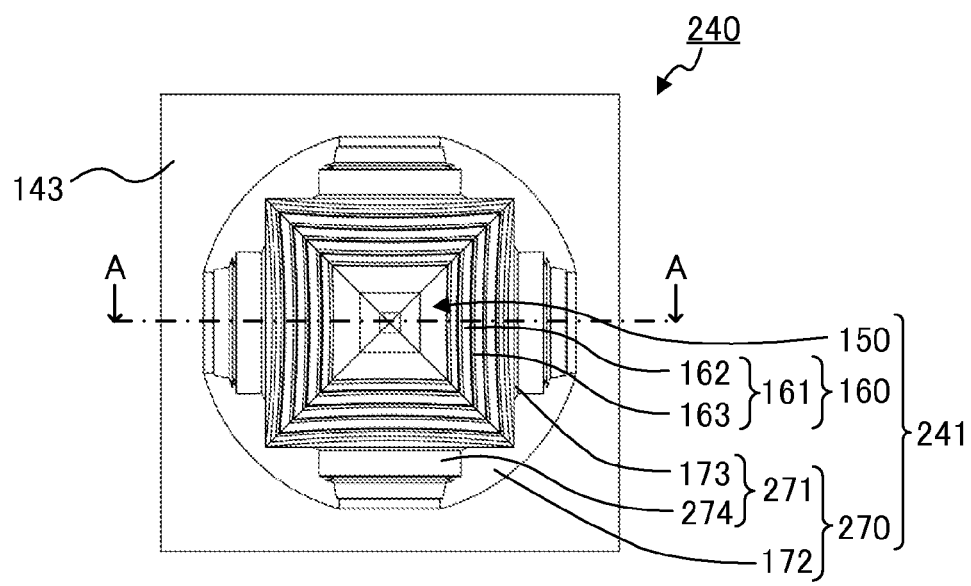
FIGS. 11A to 11C are drawings illustrating a configuration of the light flux controlling member according to Embodiment 2.
Figure 11B:
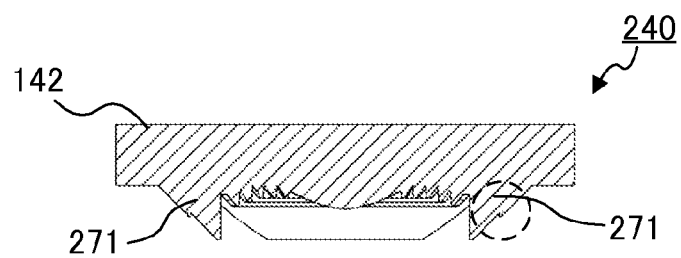
Figure 11C:
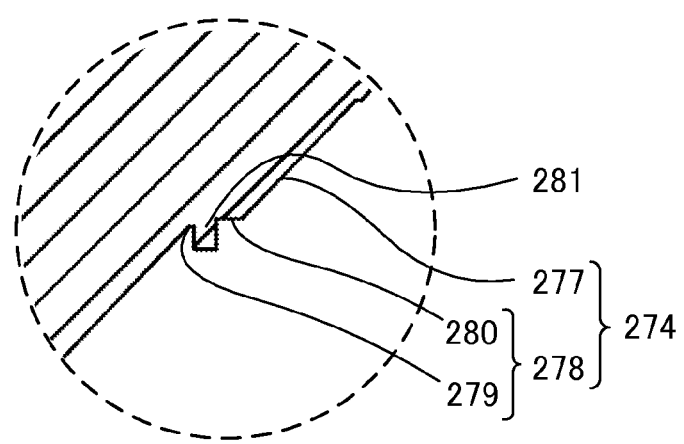

FIGS. 10, and 11A, 11B and 11C are drawings illustrating the configuration of light flux controlling member 240 according to Embodiment 2. FIG. 10 is a perspective view of light flux controlling member 240 according to Embodiment 2. FIG. 11A is a bottom view of light flux controlling member 240, FIG. 11B is a sectional view taken along line A-A illustrated in FIG. 11A, and FIG. 11C is a partially enlarged sectional view of an area indicated by a broken line in FIG. 11B.

As illustrated in FIGS. 10, and 11A, 11B and 11C, incidence area 241 of light flux controlling member 240 according to Embodiment 2 includes refraction part 150, Fresnel lens part 160, and outermost lens part 270.

Outermost lens part 270 has four second protrusions 271, and four corners 172. Each of four second protrusions 271 has second incidence surface 173, second reflection surface 274, and projection part 281. Second reflection surface 274 has split reflection surface 277 and stepped surface 278. Split reflection surfaces 277 are spaced apart from each other in the direction orthogonal to central axis CA. Specifically, split reflection surface 277 and stepped surface 278 are disposed alternately on the surface of second reflection surface 274 from light emitting element 120 side to emission area 142 side.

As illustrated in FIG. 11C, stepped surface 278 of light flux controlling member 240 according to Embodiment 2 has first stepped surface 279 and second stepped surface 280. In the present embodiment, the clearance between second stepped surface 280 and the tip portion of projection part 281 is longer than the clearance between first stepped surface 279 and the tip portion of projection part 281, in the direction along central axis CA of light flux controlling member 240. Thus, it becomes possible to enlarge a space that is available as a pool for adhesive 131 when adhering the outer peripheral surface of projection part 281 to supporting part 130. Accordingly, adhesive 131 can be inhibited from being sticking to second reflection surface 274. Further, it is also possible to fix light flux controlling member 240 to substrate 110 (supporting part 130) more stably. The clearance between first stepped surface 279 and second stepped surface 280 in the direction along central axis CA of light flux controlling member 240 is not particularly limited insofar as second stepped surface 280 is positioned at a dead angle relative to the traveling direction of light having entered light flux controlling member 240. The clearance between first stepped surface 279 and second stepped surface 280 in the direction along central axis CA of light flux controlling member 240 is preferably 10 µm or more and 50 µm or less, for example.

(Effect)

As described above, light flux controlling member 240 according to the present embodiment can prevent the decrease in the optical performance due to the sticking of adhesive 131 when being fixed to substrate 110 (supporting part 130) without becoming larger in size, and can further fix light flux controlling member 240 to substrate 110 (supporting part 130) more stably.

Embodiment 3

(Configurations of Light Flux Controlling Member and Light Emitting Device)

The light emitting device and the illumination apparatus according to Embodiment 3 differ, respectively, from light emitting device 100 and illumination apparatus 500 according to Embodiment 1 in the shape of light flux controlling member 340. Light flux controlling member 340 according to Embodiment 3 differs from light flux controlling member 140 according to Embodiment 1 only in the shape of stepped surface 378 in second reflection surface 374 of outermost lens part 370. Thus, the same components as those of light emitting device 100 and illumination apparatus 500 according to Embodiment 1 are indicated by the same reference signs, and the explanations therefor will be omitted. The components that are different from those of light flux controlling member 140 will be mainly described.

Figure 12:
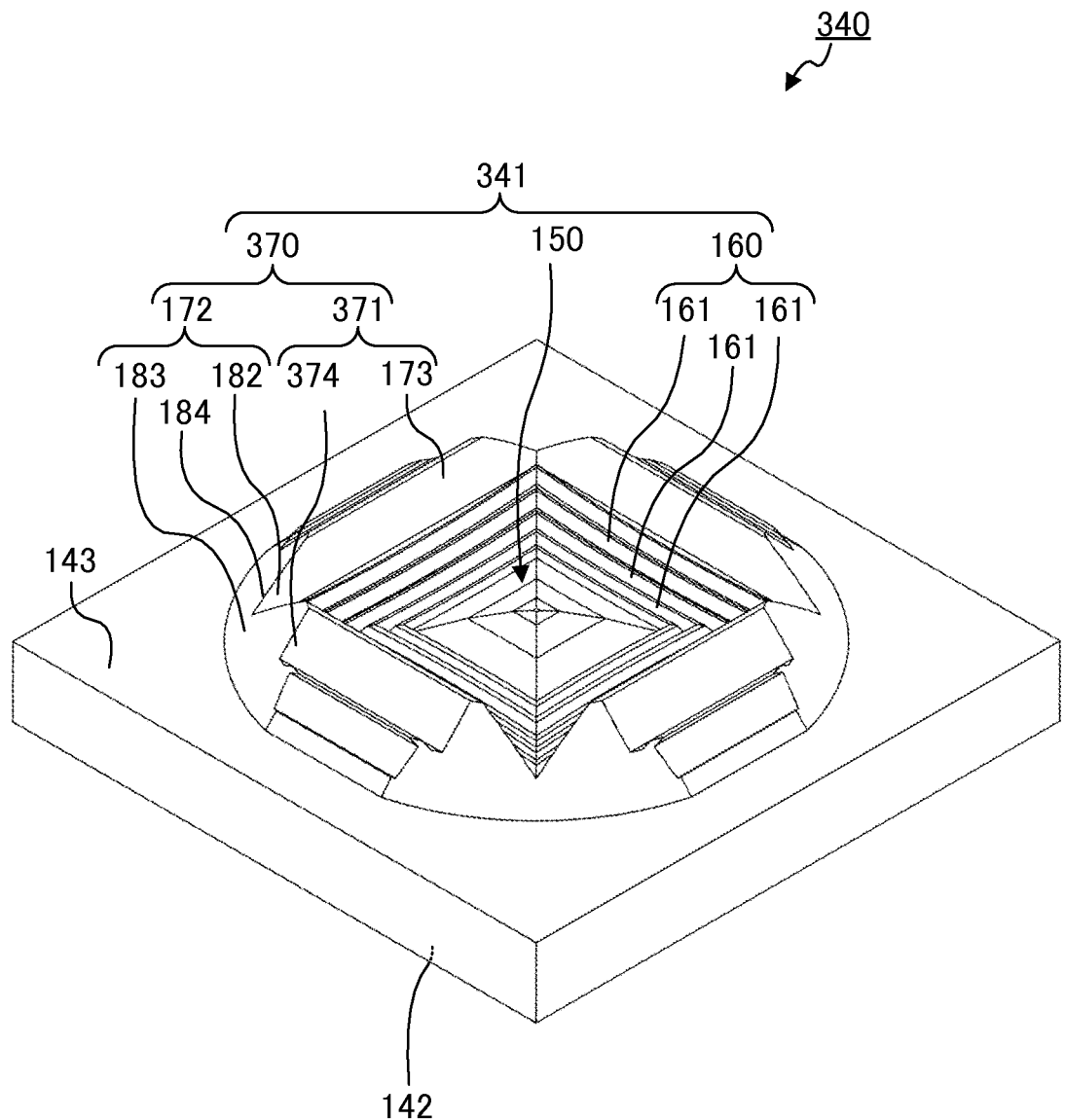
FIG. 12 is a perspective view of a light flux controlling member according to Embodiment 3.
Figure 13A:
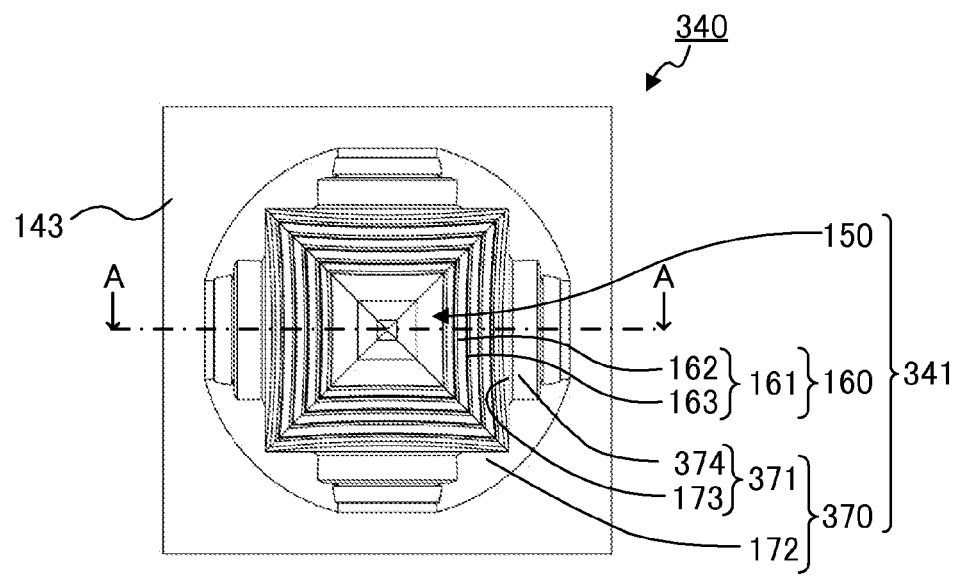
FIGS. 13A to 13C are drawings illustrating a configuration of the light flux controlling member according to Embodiment 3.
Figure 13B:
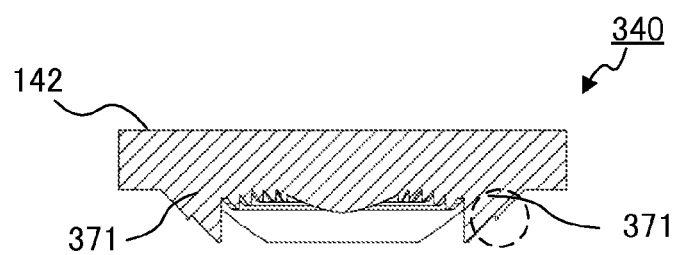
Figure 13C:
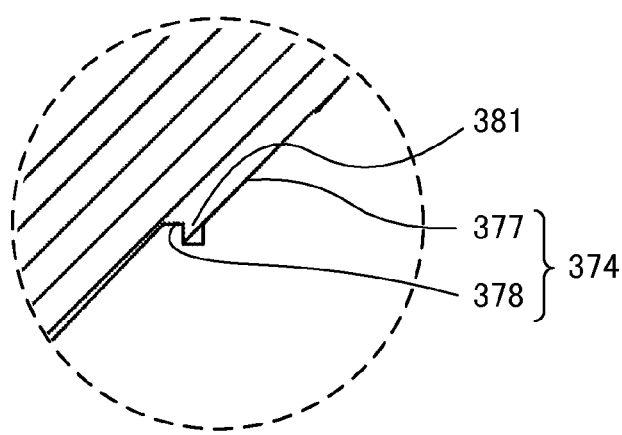

FIGS. 12, and 13A, 13B and 13C are drawings illustrating the configuration of light flux controlling member 340 according to Embodiment 3. FIG. 12 is a perspective view of light flux controlling member 340 according to Embodiment 3. FIG. 13A is a bottom view of light flux controlling member 340, FIG. 13B is a sectional view taken along line A-A illustrated in FIG. 13A, and FIG. 13C is a partially enlarged sectional view of an area indicated by a broken line in FIG. 13B.

As illustrated in FIGS. 12, and 13A, 13B and 13C, incidence area 341 of light flux controlling member 340 according to Embodiment 3 includes refraction part 150, Fresnel lens part 160, and outermost lens part 370.

Outermost lens part 370 has four second protrusions 371, and four corners 172. Each of four second protrusions 371 has second incidence surface 173, second reflection surface 374, and projection part 381. Second reflection surface 374 has split reflection surface 377 and stepped surface 378. Split reflection surfaces 377 are spaced apart from each other in the direction orthogonal to central axis CA. Specifically, split reflection surface 377 and stepped surface 378 are disposed alternately on the surface of second reflection surface 374 from light emitting element 120 side to emission area 142 side.

As illustrated in FIG. 13C, projection part 381 of light flux controlling member 340 according to Embodiment 3 is disposed at the outer peripheral portion of stepped surface 378. Also in this case, stepped surface 378 and projection part 381 are positioned at a dead angle relative to the traveling direction of light having entered light flux controlling member 340.

(Effect)

The light emitting device and the illumination apparatus according to Embodiment 3 have the similar effects to those of Embodiment 1.

Embodiment 4

(Configurations of Light Flux Controlling Member and Light Emitting Device)

The light emitting device and the illumination apparatus according to Embodiment 4 differ, respectively, from light emitting device 100 and illumination apparatus 500 according to Embodiment 1 in the shape of light flux controlling member 440. Light flux controlling member 440 according to Embodiment 4 differs from light flux controlling member 140 according to Embodiment 1 in that light flux controlling member 440 has a circular shape in a plan view. Thus, explanations for the same components as those of light emitting device 100 and illumination apparatus 500 according to Embodiment 1 will be omitted, and the components that are different from those of light flux controlling member 140 will be mainly described.

Figure 14:
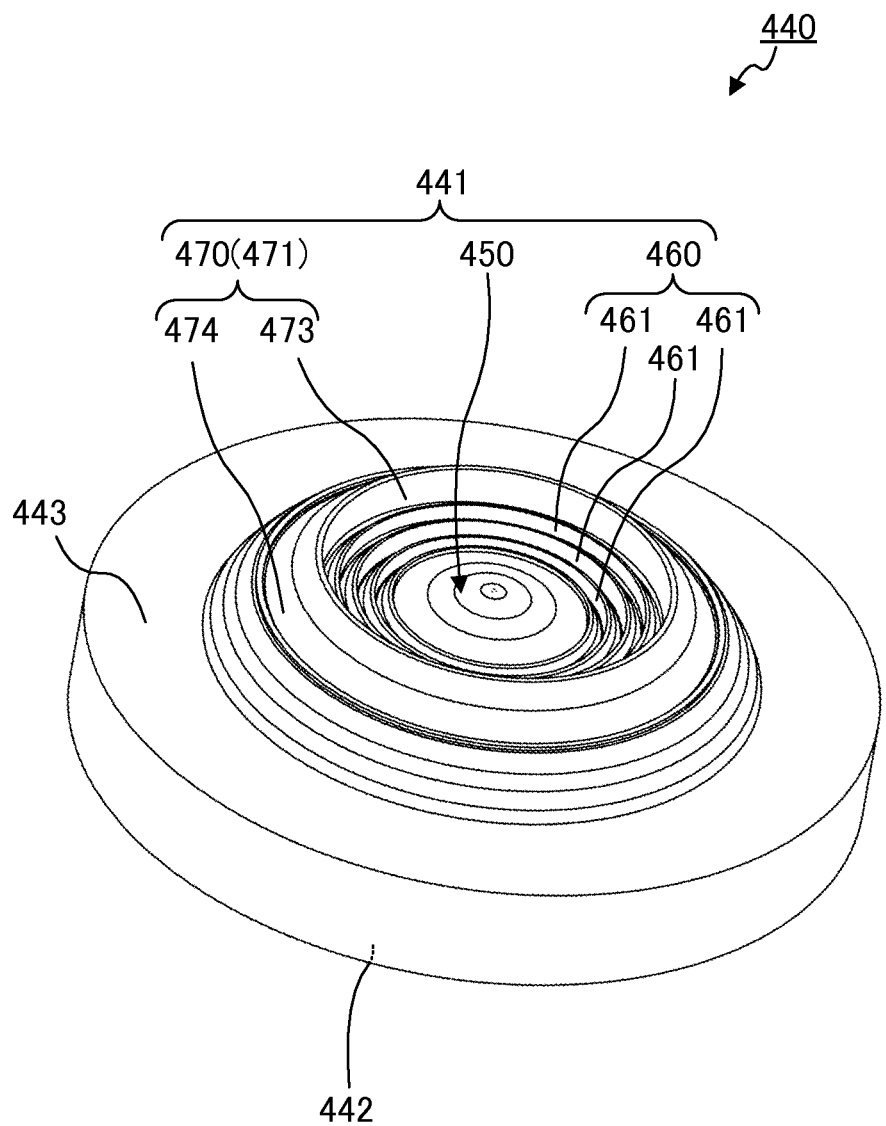
FIG. 14 is a perspective view of a light flux controlling member according to Embodiment 4.
Figure 15A:
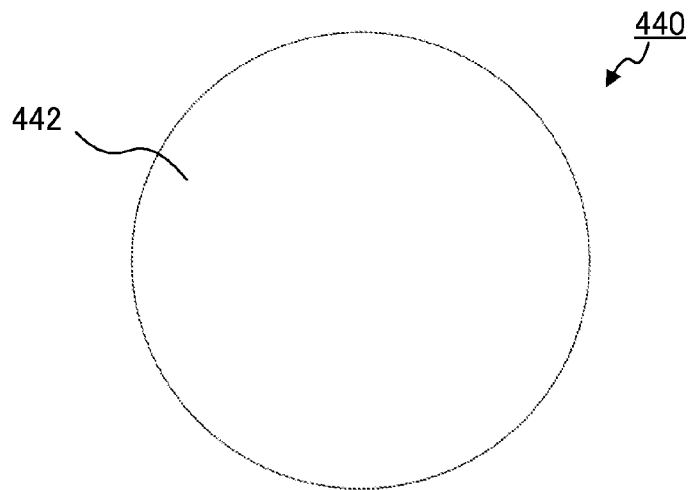
FIGS. 15A to 15C are drawings illustrating a configuration of the light flux controlling member according to Embodiment 4.
Figure 15B:
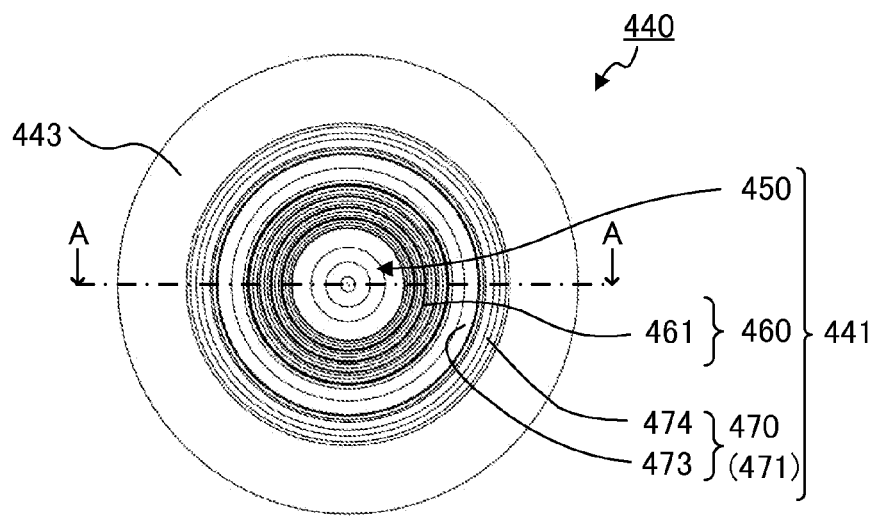
Figure 15C:
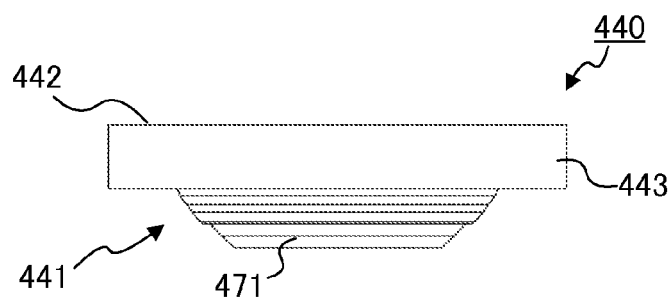
Figure 16A:
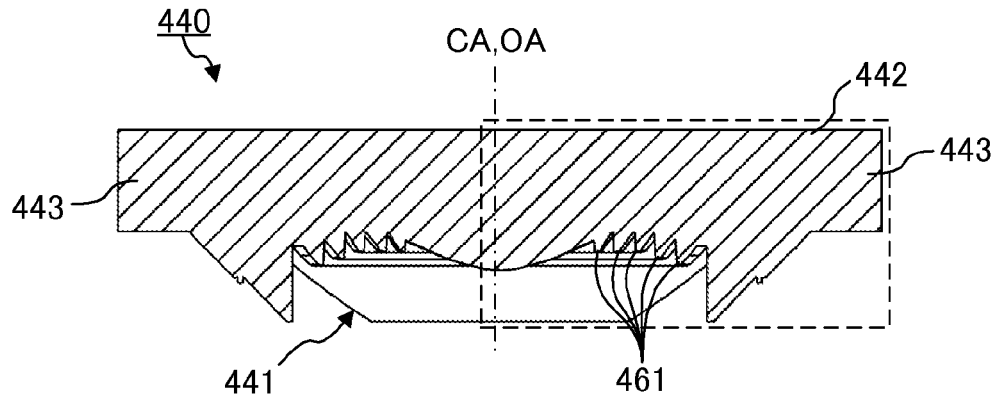
FIGS. 16A to 16C are sectional views of the light flux controlling member according to Embodiment 4.
Figure 16B:
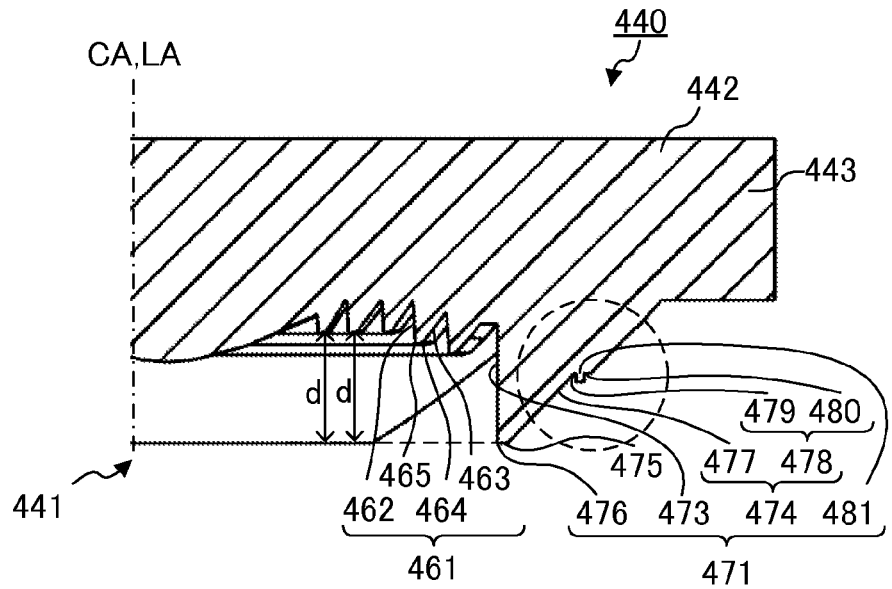
Figure 16C:
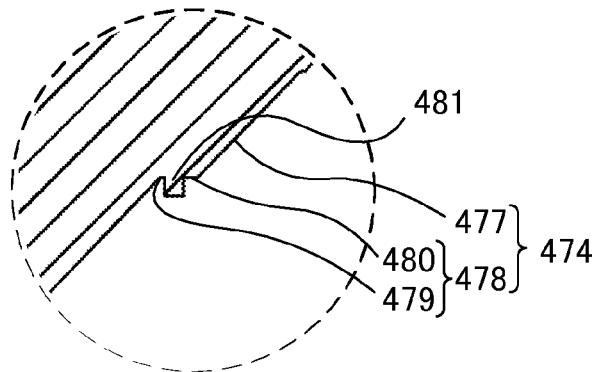

FIGS. 14 to 16A, 16B and 16C are drawings illustrating the configuration of light flux controlling member 440 according to Embodiment 4. FIG. 14 is a perspective view of light flux controlling member 440 according to Embodiment 4. FIG. 15A is a plan view of light flux controlling member 440, FIG. 15B is a bottom view of light flux controlling member 440, and FIG. 15C is a side view of light flux controlling member 440. FIG. 16A is a sectional view taken along line A-A illustrated in FIG. 15B, FIG. 16B is a partially enlarged sectional view of an area indicated by a broken line in FIG. 16A, and FIG. 16C is a partially enlarged sectional view of an area indicated by a broken line in FIG. 16B.

As illustrated in FIGS. 14 to 16A, 16B and 16C, light flux controlling member 440 includes incidence area 441 that allows light emitted from light emitting element 120 (illustration omitted) to enter light flux controlling member 440, and an emission area 442 that is positioned facing away from incidence area 441 and configured to emit the incident light. Flange 443 may be provided between incidence area 441 and emission area 442.

As illustrated in FIG. 15A, in the present embodiment, light flux controlling member 440 has a circular shape in a plan view. In addition, the diameter of light flux controlling member 440 in the present embodiment is, for example, about 4.7 mm.

Incidence area 441 allows light emitted from light emitting element 120 to enter light flux controlling member 440. Incidence area 441 includes refraction part 450 positioned at the central portion of incidence area 441, Fresnel lens part 460 positioned outside refraction part 450, and outermost lens part 470 positioned outside Fresnel lens part 460. In the present embodiment, the outer shape of incidence area 441 is circular.

Refraction part 450 allows a part of light emitted (light emitted at a smaller angle relative to optical axis OA) from light emitting element 120 to enter light flux controlling member 440, and refracts the incident light toward emission area 442. As illustrated in FIG. 16A, refraction part 450 is disposed at a position facing light emitting element 120 to intersect central axis CA of light flux controlling member 440 (optical axis OA of light emitting element 120). It is noted that the shape of refraction part 450 is not particularly limited insofar as refraction part 450 can exhibit the abovementioned functions. In the present embodiment, the surface of refraction part 450 is an aspherical surface, and the shape of refraction part 450 is an approximately conical shape.

Fresnel lens part 460 allows a part of light emitted (light emitted at a relatively larger angle relative to optical axis OA) from light emitting element 120 to enter light flux controlling member 440, and reflects the incident light toward emission area 442. In the present embodiment, Fresnel lens 460 is disposed to surround central axis CA of light flux controlling member 440 around the entire circumference. Fresnel lens 460 has a plurality of first protrusions 461 for controlling the traveling direction of the light emitted from light emitting element 120.

A plurality of first protrusions 461 are disposed to surround central axis CA of light flux controlling member 440 around the entire circumference. As illustrated in FIG. 16B, a plurality of first protrusions 461 are disposed such that a valley portion is formed between two adjacent first protrusions 461. First protrusion 461 has first incidence surface 462, first reflection surface 463, first connection surface 464, and first ridge line 465. As illustrated in FIG. 16B, in first protrusion 461, first incidence surface 462 is disposed inside (central axis CA side), and first reflection surface 463 is disposed outside.

First incidence surface 462 allows a part of light emitted from light emitting element 120 to enter light flux controlling member 440, and refracts the part of the light toward first reflection surface 463. First incidence surface 462 is disposed to surround central axis CA around the entire circumference. Therefore, in the present embodiment, first incidence surface 462 is a curved surface. First incidence surface 462 preferably slightly inclines relative to central axis CA from the viewpoint of forming light flux controlling member 440.

First reflection surface 463 is formed together with first incidence surface 462 in pairs, and reflects light having entered light flux controlling member 440 toward emission area 442. First reflection surface 463 is disposed to surround central axis CA around the entire circumference. Therefore, in the present embodiment, first reflection surface 463 is a curved surface. In addition, first reflection surface 463 preferably inclines relative to central axis CA from the viewpoint of totally reflecting the light having reached reflection surface 463. First reflection surface 463 inclines to be closer to central axis CA as being closer to the end portion (reference plane) of light flux controlling member 440 on light emitting element 120 side.

First connection surface 464 is disposed between first incidence surface 462 and first reflection surface 463. First connection surface 464 links first incidence surface 462 to first reflection surface 463. First connection surface 464 either may be a planar surface, or may be a curved surface. In addition, first incidence surface 462 and first reflection surface 463 may be directly linked together without forming first connection surface 464.

First ridge line 465 is a boundary line between first incidence surface 462 and first connection surface 464. It is noted that, when first connection surface 464 is not formed, first ridge line 465 is a boundary line between first incidence surface 462 and first reflection surface 463. In the present embodiment, when incidence area 441 is viewed in a plan view, first ridge line 465 is circular.

Outermost lens part 470 allows a part of light emitted (light emitted at a larger angle relative to optical axis OA) from light emitting element 120 to enter light flux controlling member 440, and reflects the incident light toward emission area 442. Outermost lens part 470 is composed of one second protrusion 471. Outermost lens part 470 (second protrusion 471) is disposed to surround central axis CA of light flux controlling member 440 around the entire circumference.

The sectional shape of second protrusion 471 in the cross-section including central axis CA (vertical cross-section) is approximately triangular. As illustrated in FIG. 16B, second protrusions 471 has second incidence surface 473, second reflection surface 474, second connection surface 475, second ridge line 476, and projection part 481. In second protrusion 471, second incidence surface 473 is disposed inside (central axis CA side), and second reflection surface 474 is disposed outside.

Second incidence surface 473 allows light emitted from light emitting element 120 to enter light flux controlling member 440, and refracts the light toward second reflection surface 474. Second incidence surface 473 is disposed to surround central axis CA of light flux controlling member 440 around the entire circumference. Therefore, in the present embodiment, second incidence surface 473 is a curved surface. In addition, second incidence surface 473 either may be a vertical surface parallel to central axis CA, or may be an inclining surface inclining relative to central axis CA. In the present embodiment, second incidence surface 473 inclines to be away from central axis CA as being closer to the end portion (reference plane) of light flux controlling member 440 on light emitting element 120 side.

Second reflection surface 474 is formed together with second incidence surface 473 in pairs, and reflects light having entered light flux controlling member 440 toward emission area 442. Second reflection surface 474 is disposed to surround central axis CA of light flux controlling member 440 around the entire circumference. Second reflection surface 474 has a plurality of split reflection surfaces 477 and stepped surface 478. Split reflection surfaces 477 are spaced apart from each other in the direction orthogonal to central axis CA. Specifically, split reflection surface 477 and stepped surface 478 are disposed alternately to follow the surface of second reflection surface 474 from light emitting element 120 side to emission area 442 side.

Split reflection surface 477 reflects light having entered light flux controlling member 440 toward emission area 442. The number of split reflection surface 477 is not particularly limited insofar as a plurality of split reflection surfaces 477 are provided. In the present embodiment, the number of split reflection surface 477 is three. Split reflection surface 477 is formed to surround central axis CA around the entire circumference. Split reflection surface 477 inclines to be closer to central axis CA as being closer to the end portion (reference plane) of light flux controlling member 440 on light emitting element 120 side.

Stepped surface 478 is disposed between two adjacent split reflection surfaces 477. In the present embodiment, stepped surface 478 has first stepped surface 479 and second stepped surface 480. First stepped surface 479 is disposed to be inside and adjacent to projection part 481. Second stepped surface 480 is disposed to be outside and adjacent to projection part 481. In addition, in the present embodiment, the clearance between first stepped surface 479 and the tip portion of projection part 481 is the same as the clearance between second stepped surface 480 and the tip portion of projection part 481, in the direction along central axis CA. Stepped surface 478 is disposed at a dead angle position relative to the traveling direction of light having entered light flux controlling member 440. The number of stepped surface 478 is one or two or more. Stepped surface 478 either may or may not be formed to surround central axis CA around the entire circumference. In the present embodiment, stepped surface 478 is formed to surround central axis CA around the entire circumference. Stepped surfaces 478 either may be a planar surface, or may be a curved surface. In the present embodiment, stepped surface 478 is a planar surface. The inclining angle of stepped surface 478 is not particularly limited insofar as the light having entered light flux controlling member 440 does not reach stepped surface 478 directly. In the present embodiment, the angle of stepped surface 478 relative to central axis CA is 90°.

Second ridge line 476 is a boundary line between second incidence surface 473 and second connection surface 475. It is noted that, when second connection surface 475 is not formed, second ridge line 476 is a boundary line between second incidence surface 473 and second reflection surface 474 (split reflection surface 477). In the present embodiment, second ridge line 476 is circular when incidence area 441 is viewed in a plan view.

Projection part 481 is a convex part projecting in the direction along the central axis CA from stepped surface 478. Projection part 481 is an adhesion target part when light flux controlling member 440 is fixed to the substrate. Projection part 481 is formed on stepped surface 478 and is positioned at a dead angle relative to the light having entered light flux controlling member 440, and thus does not affect the optical performance of the light emitting device. Projection part 481 is disposed between first stepped surface 479 and second stepped surface 480. In the direction along central axis CA, the tip portion of projection part 481 is positioned closer to emission area 442 than the end portion (reference plane) of light flux controlling member 440 on light emitting element 120 side is to emission area 442. The height of projection part 481 is not particularly limited insofar as projection part 481 satisfies the above-described requirements.

Projection part 481 either may or may not be formed to surround central axis CA around the entire circumference. In the present embodiment, in a cross-section including central axis CA (vertical cross-section), one projection part 481 having a rectangular sectional shape is formed to surround central axis CA around the entire circumference.

As illustrated in FIG. 16A, emission area 442 is a planar surface formed on an area to be irradiated side, opposite to light emitting element 120. Emission area 442 is formed to intersect central axis CA of light flux controlling member 440. Emission area 442 emits light having entered light flux controlling member 440, light having entered light flux controlling member 440 and being reflected at first reflection surface 463, and light having entered light flux controlling member 440 and being reflected at second reflection surface 474 toward the area to be irradiated.

(Effect)

The light emitting device and the illumination apparatus according to Embodiment 4 have the similar effects to those of Embodiment 1 except that the area to be irradiated is illuminated circularly.

It is noted that, in the present embodiment, a description has been given on light flux controlling member 440 in which the clearance between first stepped surface 479 and the tip portion of projection part 481 is the same as the clearance between second stepped surface 480 and the tip portion of projection part 481, in the direction along central axis CA. However, the clearance between the second stepped surface and the tip portion of the projection part may be longer than the clearance between the first stepped surface and the tip portion of the projection part. In addition, the projection part may be disposed at the outer peripheral portion of the first stepped surface without the second stepped surface being provided While, in the present embodiment, a description has been given on light flux controlling member 440 having a circular shape in a plan view, the shape of light flux controlling member 440 in a plan view may be oval.

In Embodiments 1 to 3, first ridge line 165 of first protrusion 161 either may be a straight line, or may be a curve being convex outwardly.

INDUSTRIAL APPLICABILITY

The light flux controlling member according to the present invention is capable of preventing the decrease in the optical performance when being fixed to the substrate, without becoming larger in size. The light emitting device and the illumination apparatus having this light flux controlling member can be manufactured at high yield without becoming larger in size. The light emitting device according to the present invention is useful as a flash of a camera and the like, for example. Further, the illumination apparatus according to the present invention is useful as an ordinary indoor lighting, a surface light source apparatus of which surface to be irradiated is a liquid crystal panel, and the like, for example.

REFERENCE SIGNS LIST

10 Fresnel lens
12 Substrate
14 Lens part

16 Projection part
18 Support attaching surface
20 Support
30 Adhesive
100 Light emitting device
110 Substrate
120 Light emitting element
130 Supporting part
131 Adhesive
140, 240, 340, 440 Light flux controlling member
141, 241, 341, 441 Incidence area
142, 442 Emission area
143, 443 Flange
150, 450 Refraction part
160, 460 Fresnel lens part
161, 461 First protrusion
162, 462 First incidence surface
163, 463 First reflection surface
164, 464 First connection surface
165, 465 First ridge line
170, 270, 370, 470 Outermost lens part
171, 271, 371, 471 Second protrusion
172 Corner
173, 473 Second incidence surface
174, 274, 374, 474 Second reflection surface
175, 475 Second connection surface
176, 476 Second ridge line
177, 277, 377, 477 Split reflection surface
178, 278, 378, 478 Stepped surface
179, 279, 479 First stepped surface
180, 280, 480 Second stepped surface
181, 281, 381, 481 Projection part
182 Third incidence surface
183 Third reflection surface
184 Third ridge line
500 Illumination apparatus
510 Cover
L1 First diagonal line
L2 Second diagonal line
S1 First virtual quadrangle
S2 Second virtual quadrangle
CA Central axis
OA Optical axis

The invention claimed is:

1. A light flux controlling member that controls a distribution of light emitted from a light emitting element, comprising:
an incidence area that allows light emitted from the light emitting element to enter the light flux controlling member; and
an emission area that is formed facing away from the incidence area and configured to emit light having entered the light flux controlling member,
wherein:
the incidence area includes a plurality of protrusions disposed to surround a central axis of the light flux controlling member and each protrusion having an incidence surface that is disposed on an inner side of the protrusion and allows a part of the light emitted from the light emitting element to enter the light flux controlling member, a reflection surface that is disposed on an outer side of the protrusion and reflects the incident light toward the emission area, and a ridge line disposed between the incidence surface and the reflection surface,
the reflection surface disposed outermost including:
a plurality of split reflection surfaces that are spaced apart from each other and reflect the light having entered the light flux controlling member toward the emission area, and
one or two or more stepped surfaces disposed between the two adjacent split reflection surfaces and at a dead angle position relative to a traveling direction of the light having entered the light flux controlling member, and
the protrusion disposed outermost has a projection part projecting in a direction along the central axis from the one or two or more stepped surfaces, with a tip portion of the projection part being closer to the emission area than an end portion of the light flux controlling member on the light emitting element side is to the emission area in the direction along the central axis.

2. The light flux controlling member according to claim 1, wherein:
the one or two or more stepped surfaces includes a first stepped surface disposed inside and adjacent to the projection part, and a second stepped surface disposed outside and adjacent to the projection part; and
a clearance between the second stepped surface and the tip portion of the projection part is longer than a clearance between the first stepped surface and the tip portion of the projection part in the direction along the central axis.

3. The light flux controlling member according to claim 2, wherein a clearance between the first stepped surface and the second stepped surface in the direction along the central axis is 10 μm or more and 50 μm or less.

4. The light flux controlling member according to claim 1, wherein:
the one or two or more stepped surfaces includes a first stepped surface disposed inside and adjacent to the projection part, and a second stepped surface disposed outside and adjacent to the projection part; and
a clearance between the first stepped surface and the tip portion of the projection part is the same as a clearance between the second stepped surface and the tip portion of the projection part in the direction along the central axis.

5. The light flux controlling member according to claim 1, wherein the projection part is disposed at an outer peripheral portion of the one or two or more stepped surfaces.

6. A light emitting device comprising:
a substrate;
a supporting part disposed on the substrate;
a light emitting element disposed on the substrate; and
the light flux controlling member according to claim 1, disposed over the substrate such that a central axis of the light flux controlling member coincides with an optical axis of the light emitting element, and fixed to the supporting part, wherein:
the supporting part and the projection part are adhered together.

7. A light emitting device comprising:
a substrate;
a supporting part disposed on the substrate;
a light emitting element disposed on the substrate; and
the light flux controlling member according to claim 2, disposed over the substrate such that a central axis of the light flux controlling member coincides with an optical axis of the light emitting element, and fixed to the supporting part, wherein:
the supporting part and the projection part are adhered together.

8. A light emitting device comprising:
a substrate;
a supporting part disposed on the substrate;
a light emitting element disposed on the substrate; and
the light flux controlling member according to claim 3, disposed over the substrate such that a central axis of the light flux controlling member coincides with an optical axis of the light emitting element, and fixed to the supporting part, wherein:
the supporting part and the projection part are adhered together.

9. A light emitting device comprising:
a substrate;
a supporting part disposed on the substrate;
a light emitting element disposed on the substrate; and
the light flux controlling member according to claim 4, disposed over the substrate such that a central axis of the light flux controlling member coincides with an optical axis of the light emitting element, and fixed to the supporting part, wherein:
the supporting part and the projection part are adhered together.

10. A light emitting device comprising:
a substrate;
a supporting part disposed on the substrate;
a light emitting element disposed on the substrate; and
the light flux controlling member according to claim 5, disposed over the substrate such that a central axis of the light flux controlling member coincides with an optical axis of the light emitting element, and fixed to the supporting part, wherein:
the supporting part and the projection part are adhered together.

11. An illumination apparatus comprising:
the light emitting device according to claim 6, and
a cover that transmits light emitted from the light emitting device while diffusing the emitted light.

12. An illumination apparatus comprising:
the light emitting device according to claim 7, and
a cover that transmits light emitted from the light emitting device while diffusing the emitted light.

13. An illumination apparatus comprising:
the light emitting device according to claim 8, and
a cover that transmits light emitted from the light emitting device while diffusing the emitted light.

14. An illumination apparatus comprising:
the light emitting device according to claim 9, and
a cover that transmits light emitted from the light emitting device while diffusing the emitted light.

15. An illumination apparatus comprising:
the light emitting device according to claim 10, and
a cover that transmits light emitted from the light emitting device while diffusing the emitted light.

* * * * *